US011262717B2

United States Patent
Koyama et al.

(10) Patent No.: US 11,262,717 B2
(45) Date of Patent: Mar. 1, 2022

(54) OPTIMIZATION DEVICE AND CONTROL METHOD OF OPTIMIZATION DEVICE BASED ON TEMPERATURE STATISTICAL INFORMATION

(71) Applicant: FUJITSU LIMITED, Kawasaki (JP)

(72) Inventors: Jumpei Koyama, Setagaya (JP); Noboru Yoneoka, Kawasaki (JP); Yasuhiro Watanabe, Kawasaki (JP); Motomu Takatsu, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 16/583,344

(22) Filed: Sep. 26, 2019

(65) Prior Publication Data

US 2020/0166900 A1 May 28, 2020

(30) Foreign Application Priority Data

Nov. 22, 2018 (JP) .............................. JP2018-219079

(51) Int. Cl.
*G05B 19/042* (2006.01)
*G06N 7/00* (2006.01)
*G06Q 10/00* (2012.01)

(52) U.S. Cl.
CPC ........... *G05B 19/042* (2013.01); *G06N 7/005* (2013.01); *G06Q 10/00* (2013.01); *G05B 2219/50333* (2013.01)

(58) Field of Classification Search
CPC ........ G05B 19/042; G05B 2219/50333; G06N 7/005; G06N 5/003; G06F 17/11; G06Q 10/04
See application file for complete search history.

(56) References Cited

U.S. PATENT DOCUMENTS

2018/0005114 A1  1/2018  Tomita et al.

FOREIGN PATENT DOCUMENTS

| JP | H09-231197 A | 9/1997 |
| JP | H09-325949 A | 12/1997 |
| JP | 2018-005541 A | 1/2018 |

OTHER PUBLICATIONS

Li, Yaohang Li et al., "Hybrid parallel tempering and simulated annealing method", Applied Mathematics and Computation, Elsevier, US, vol. 212, No. 1, Jun. 2009, pp. 216-228, XP026085856.
(Continued)

*Primary Examiner* — Tejal Gami
(74) *Attorney, Agent, or Firm* — Fujitsu Patent Center

(57) ABSTRACT

An optimization device includes: search circuits, each configured to: hold values of state variables included in an evaluation function representing an energy value; calculate a change value of the energy value for each of state transitions which occurs in response to a change in one of the state variables; and determine stochastically whether to accept one of the state transitions according to a relative relationship between the change value of the energy value and thermal excitation energy, based on a set temperature value, the change value, and a random number value; and a controller configured to: acquire statistical information regarding a transition of a temperature value in each search circuit; determine a temperature value to be set in each search circuit based on the statistical information; set the temperature value for each search circuit; and exchange the temperature value or the values of the state variables between the search circuits.

9 Claims, 25 Drawing Sheets

(56) References Cited

OTHER PUBLICATIONS

Munakata, Toyonori et al., "Temperature control for simulated annealing", Physical Review E. Statistical Physics, Plasmas, Fluids, and Related Interdisciplinary Topics., vol. 64, No. 4, Sep. 2001, XP055685109, pp. 046127-1 to 046127-5.
Chen, Ding-Jun et al., "Parallelizing simulated annealing algorithms based on high-performance computer", Journal of Global Optimization, Kluwer Academic Publishers, DO, vol. 39, No. 2, Feb. 20, 2007, pp. 261-289, XP019529771.
Azizi, Nader et al., "Adaptive temperature control for simulated annealing: a comparative study", Computers and Operations Research, vol. 31, No. 14, Dec. 2004, pp. 2439-2451, XP055685111.
Kilpatrick, S. et al., "Optimization by Simulated Annealing", Science, American Association for the Advancement of Science, US, vol. 220, No. 4598, May 13, 1983, pp. 671-680, XP000575729.
Ingber, Lester, "ASA Options", 2012, pp. 1-22, XP055499224, Retrieved from the Internet: URL:https://www.researchgate.net/publication/235426530_Adaptive_Simulated_Annealing [retrieved on Aug. 13, 2018].
Du, Ke-Lin et al.,"Simulated Annealing", In: "Search and Optimization by Metaheuristics", 2016, Springer International Publishing, Cham, XP055489122, pp. 29-36.
Extended European Search Report dated May 8, 2020 of corresponding European Patent Application No. 19200238.4, 11 pages.
European Office Action dated Dec. 8, 2021 for corresponding European Patent Application No. 19200238.4, 8 pages.

FIG. 7

EXAMPLE OF DATA ACQUISITION ALGORITHM

C1:
min_eg: ENERGY OBTAINED AT DATA ACQUISITION TIMING
min_eg_pre: LOWEST ENERGY UP TO THE PRESENT
tmp_idx: CURRENT TEMPERATURE VALUE
tmp_idx_pre: PAST TEMPERATURE HIGHEST VALUE
histogram: TEMPERATURE HISTOGRAM C2:
```
1  if (min_eg < min_eg_pre) {
2      histogram[tmp_idx_pre]++;
3      min_eg_pre = min_eg;
4      tmp_idx_pre = tmp_idx;
5  } else {
6      if (tmp_idx > tmp_idx_pre) {
7          tmp_idx_pre = tmp_idx;
8      }
9  }
```

OPTIMIZATION DEVICE AND CONTROL METHOD OF OPTIMIZATION DEVICE BASED ON TEMPERATURE STATISTICAL INFORMATION

CROSS-REFERENCE TO RELATED APPLICATION

This application is based upon and claims the benefit of the prior Japanese Patent Application No. 2018-219079, filed on Nov. 22, 2018, the entire contents of which are incorporated herein by reference.

FIELD

The embodiments discussed herein are related to an optimization device and a control method of the optimization device.

BACKGROUND

In the present society, information processing is performed in every field. The information processing is performed using an arithmetic apparatus such as a computer, and a prediction, a determination, a control, and the like are performed by calculating and processing various data to obtain meaningful results. One of the fields of information processing is an optimization which is regarded as an important field. For example, there may be an optimization problem of minimizing resources and costs required to perform a certain process, or an optimization problem of finding a solution which maximizes the effect of the process. It is clear that these problems are of great importance.

Among the optimization problems, most of the problems called a discrete optimization problem, a combinatorial optimization problem, and the like are known to be very difficult to solve because variables take discrete values instead of continuous values. The biggest reason that makes it difficult to solve the discrete optimization problem is that there are a large number of states called local solutions each of which is not the optimal solution but takes a minimum value in a local neighborhood.

Since there is no general solution that is effective for solving the discrete optimization problem, it is necessary to use an approximate solution method that uses properties specific to the problem or a method called metaheuristic that does not rely much on the properties of the problem.

The contents described below relates to a solution using the Markov chain Monte Carlo method which is a kind of metaheuristic method, and particularly relates to a solution called an exchange Monte Carlo method or a replica exchange method, which is a pseudo annealing method in a broad sense.

The pseudo annealing method is a method for obtaining an optimal solution by changing a state (value of a variable vector) stochastically using a random number. A problem of minimizing the value of an evaluation function to be optimized will be described below as an example, and the value of the evaluation function will be referred to as energy. For maximization, the sign of the evaluation function may be changed.

In the pseudo annealing method, when the acceptance (permission) probability of state transition is determined as follows using an energy change and temperature associated with the transition, it has proved that the state reaches the optimal solution at the limit of time (number of iterations) infinity.

[Equation 1]
$$p(\Delta E, T) = f\left(-\frac{\Delta E}{T}\right) \qquad (1)$$

[Equation 2]
$$f_{metro}(x) = \min(1, e^x) \qquad (2)$$

[Equation 3]
$$f_{Gibbs}(x) = \frac{1}{1 + e^{-x}} \qquad (3)$$

The equation (2) is the Metropolis method. The equation is the Gibbs method. Either one of the equations (2) and (3) may be used.

Here, the sign "T" is a parameter representing a temperature, and the initial value thereof needs to be sufficiently large depending on the problem, so that it is lowered sufficiently slowly.

As described above, in the pseudo annealing method, the optimal solution may be obtained when the number of iterations is infinite. However, in practice, since it is necessary to obtain a solution with a finite number of iterations, the optimal solution may not be obtained reliably. Further, as described above, since the temperature is lowered very slowly, the temperature does not fall sufficiently in a finite time. Therefore, in the actual pseudo annealing method, the temperature is often lowered more quickly than a temperature change that is theoretically guaranteed to converge.

In the actual pseudo annealing method, the operation ends when an end determination condition is satisfied such as when the above-mentioned iteration is repeated to reach a certain number of iteration while lowering the temperature starting from the initial state, or when the energy becomes lowered than a predetermined value. An output response is a state at the end. However, in practice, since the temperature does not become zero at a finite number of iterations, the state occupation probability has a distribution represented by a Boltzmann distribution or the like even at the end, and, as a result, it may not be said that an optimum value or a good solution is obtained. Therefore, a realistic solution would be keeping the lowest energy obtained so far in the middle of the iteration and outputting the lowest energy at the end.

As may be imagined to a certain extent from the above explanation, although the pseudo annealing method is versatile and attractive, it is necessary to lower the temperature slowly, and there is a problem that the calculation time becomes relatively long in the pseudo annealing method. Further, there is also a problem that it is difficult to adjust the method of lowering temperature appropriately according to the problem. When the method of lowering the temperature is too slow, the temperature does not drop much in a finite time and an energy range of the final heat distribution becomes wider. As a result, the probability of occupying a good solution does not increase. In contrast, when the temperature is lowered too quickly, since the temperature drops before escaping from the local solution and becomes a state of being caught in a bad solution, the probability of obtaining a good solution decreases.

The replica exchange method is a method of simultaneously performing the Monte Carlo search (hereinafter, referred to as "stochastic search") using multiple temperatures, comparing the energies of states at a certain number of iterations, and performing an operation of exchanging states for two temperatures with an appropriate probability FIG. 25 is a view illustrating a configuration example of an optimization device using a normal replica exchange method. The optimization device 50 includes a plurality of replicas (search units 51a1, 51a2, . . . , 51ai, . . . , 51an in FIG. 25) and an exchange controller 52, unlike the optimization device using the normal pseudo annealing method. The exchange controller 52 provides temperature information (hereinafter, referred to as inverse temperature $\beta_i$ (reciprocal of T) ($1 \leq i \leq n$)) to the search units 51a1 to 51an.

FIG. 25 illustrates an example of the search unit 51a1. The other search units have the same configuration. The search unit 51ai includes a state holding unit 60, an energy calculation unit 61, and a transition controller 62.

The state holding unit 60 holds values of a plurality of state variables included in an evaluation function. Further, the state holding unit 60 updates a state $s_i$ which is a value of a plurality of state variables (the value of the variable vector) based on a flag f indicating whether a state transition is possible and a state variable number (index) N indicated by the flag f.

The energy calculation unit 61 calculates an energy change accompanying a change (state transition) of a state variable. For example, when the evaluation function is represented by an Ising model represented by a coupling between two state variables and permits only one state variable transition at a time, the energy calculation unit 61 calculates an energy change accompanying a change (state transition) of each of a plurality of state variables based on the value of each state variable, a coupling coefficient indicating the strength of coupling between state variables, the number N, and the flag f. An energy change $\Delta E_{ij}$ indicates an energy change accompanying a change in the j-th state variable. Further, the value of the coupling coefficient according to the optimization problem to be calculated is stored in advance in a memory, a register, or the like. When the evaluation function is not the Ising model and when multiple state variable transitions are permitted at the same time, the state transition number and the changing state variable number do not necessarily match with each other, but the energy change with respect to the state transition number only needs to be appropriately calculated. The energy calculation unit 61 may be implemented using a logic circuit such as, for example, a product-sum operation circuit.

Similarly to the normal pseudo annealing method, the transition controller 62 performs the stochastic search by determining the acceptance probability of state transition of the j-th state variable according to the following equation (4) using the energy change $\Delta E_{ij}$ and the inverse temperature $\beta_i$ assigned by the exchange controller 52.

[Equation 4]

$$p(\Delta E_{ij}, \beta_i) = f(-\beta_i \Delta E_{ij}) \quad (4)$$

In the equation (4), the function f is the same as that in equation (1), and for example, the Metropolis method of equation (2) is used as the function f. Based on the state transition acceptance probability, the transition controller 62 outputs a flag f indicating whether a state transition is possible and a state transition number indicated by the flag f. Further, the transition controller 62 updates and outputs the energy $E_i$ based on the energy change $\Delta E_{ij}$.

The exchange controller 52 observes the energy E in each search unit at every fixed number of iterations, and uses the energy E and the reverse temperature $\beta$ in two of the search units 51a1 to 51an to exchange values of the state variables in the two search units based on the exchange probability represented by the following equation (5). Instead of the values of the state variables, the inverse temperatures supplied to the two search units may be exchanged.

[Equation 5]

$$p_{ij} = f((\beta_i - \beta_j)(E_i - E_j)) \quad (5)$$

In the equation (5), $\beta_i$ is the reverse temperature given to the search unit 51ai, $\beta_j$ is the reverse temperature given to the j-th search unit (not illustrated), $E_i$ is the energy in the search unit 51ai, and $E_j$ is the energy in the j-th search unit. In the equation (5), the function f is the same as the equation (1). For example, the Metropolis method of the equation (2) is used as the function f.

Even when such an exchange is performed, the probability distribution of each temperature state converges to the Boltzmann distribution for that temperature. Then, the relaxation time required to converge to the distribution may be significantly shortened compared to a case when no exchange is performed.

The two search units to be exchanged are selected so that the supplied temperatures are close (e.g., those supplied with adjacent temperatures are selected) to prevent the exchange probability from being too small.

In the optimization device 50, when the search units 51a1 to 51an that perform the iterative process many times are implemented by a dedicated circuit and the function of the exchange controller 52 is implemented by software, values (or temperature information) of state variables of the two search units that are close in temperature may be exchanged by point passing. In this case, it is not necessary to perform a sort process for arranging information for identifying the search units 51a1 to 51an in order of lower or higher temperature for each exchange, For example, there has been proposed an information processing apparatus that performs a stochastic search in a plurality of networks (referred to as ensembles) in which different temperatures are set has been proposed. The information processing apparatus exchanges the states of nodes of ensembles in accordance with a difference in energy of ensemble between ensembles whose temperatures are set adjacent to each other. As a result, falling into a local solution is prevented, and the optimum value is converged at a higher speed.

In addition, there has been proposed a constant temperature tank apparatus for temperature parallel simulated annealing that changes parameters for controlling execution of a simulated annealing algorithm so that a simulated annealing processing unit operates efficiently under a first temperature. The apparatus performs a simulated annealing process under a set condition, and stochastically exchanges a state obtained by performing the simulated annealing process with a state obtained by performing the simulated annealing process under a second temperature.

There has also been proposed an analysis system that obtains a frequency distribution on a plane stretched in two axes of the Hamming distance and the fitness for each gene belonging to the initial generation or any generation after the second generation, and changes parameters of a genetic algorithm according to the frequency distribution.

Related techniques are disclosed in, for example, Japanese Laid-open Patent Publication No. 2018-005541, Japanese Laid-open Patent Publication No. 09-231197, and Japanese Laid-open Patent. Publication No. 09-325949.

SUMMARY

According to an aspect of the embodiments, an optimization device includes: a plurality of search circuits, each including; a state hold circuit configured to hold values of a plurality of state variables included in an evaluation function representing an energy value; an energy calculation circuit configured to perform a ground state search by calculating a change value of the energy value for each of a plurality of state transitions which occurs in response to a change in one of values of the plurality of state variables; and a transition controller configured to determine stochastically whether to accept one of the plurality of state transitions according to a relative relationship between the change value of the energy value and thermal excitation energy, based on a set temperature value, the change value, and a random number value; and a controller including: a temperature adjustment circuit configured to: acquire temperature statistical information, which is statistical information regarding a transition of a temperature value in each of the plurality of search circuits; and determine the temperature value to be set in each of the plurality of search circuits based on the acquired temperature statistical information; a temperature controller configured to set the determined temperature value for each of the plurality of search circuits; and an exchange controller configured to exchange the temperature value or the values of the plurality of state variables between the plurality of search circuits after a predetermined number of repetitions of the ground state search for the energy value is reached or after a predetermined time elapses.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a view illustrating an example of a data acquisition algorithm.

DESCRIPTION OF EMBODIMENTS

Hereinafter, embodiments will be described with reference to the accompanying drawings.

First Embodiment

Figure 1:
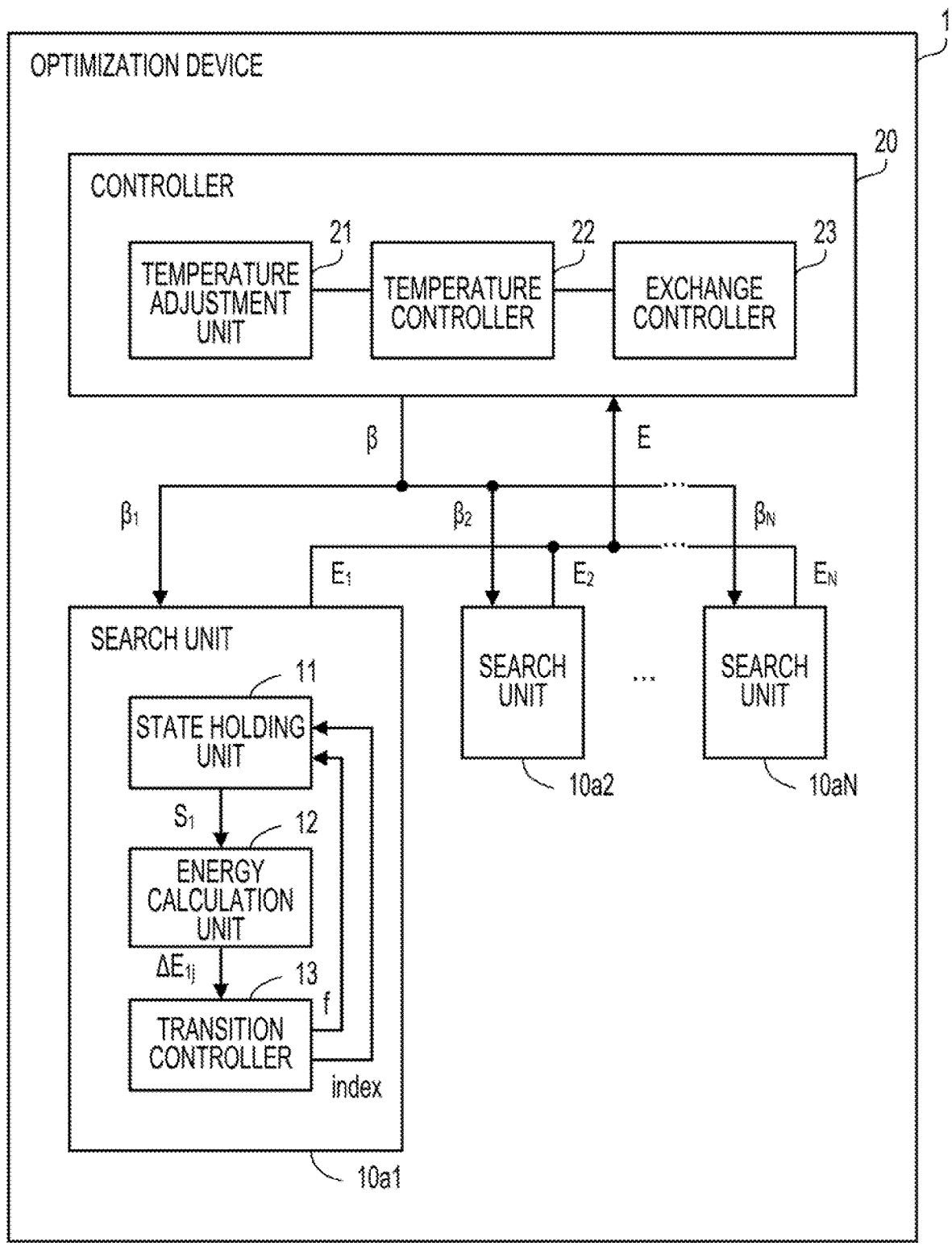
FIG. 1 is a view illustrating an optimization device according to a first embodiment.

A first embodiment will be described.
FIG. 1 is a view illustrating an optimization device according to a first embodiment.
The optimization device 1 includes a plurality of search units (search units $10a1, 10a2, \ldots, 10aN$) and a controller 20. The sign "N" represents an integer of 2 or more and corresponds to the number of search units. Each of the search units $10a1$ to $10aN$ includes a state holding unit, an energy calculation unit, and a transition controller. For example, the search unit $10a1$ includes a state holding unit 11, an energy calculation unit 12, and a transition controller 13.

The state holding unit 11 holds values of a plurality of state variables included in an evaluation function representing an energy value. In FIG. 1, an energy value in the search unit $10a1$ is represented by $E_1$, and values of a plurality of state variables in the search unit $10a1$ are represented by $s_1$.

When a plurality of state transitions occurs in response to a change in any of the values of the plurality of state variables, the energy calculation unit 12 performs a ground state search by calculating a change value ($\Delta E_{ij}$) of the energy value for each of the plurality of state transitions.

Based on a set temperature value, the change value, and a random number value, the transition controller 13 determines stochastically whether to accept any of the plurality of state transitions according to a relative relationship between the change value of the energy value and the thermal excitation energy. As described above, the transition controller 13 determines whether a state transition is possible based on the equation (4), and outputs a flag f indicating whether state transition is possible and a state transition number indicated by the flag f. In FIG. 1, the state transition number indicated by the flag f is represented by an index.

The search units $10a1$ to $10aN$ operate in parallel to perform the above-described ground state search.

The controller 20 controls the search units 10a1 to 10aN. The controller 20 includes a temperature adjustment unit 21, a temperature controller 22, and an exchange controller 23.

The temperature adjustment unit 21 acquires temperature statistical information that is statistical information regarding the transition of a temperature value in each of the search units 10a1 to 10aN, and determines a temperature value to be set in each of the search units 10a1 to 10aN based on the acquired temperature statistical information. Since the number of search units 10a1 to 10aN is N, the number of set temperature values is N. The N temperature values are different from each others. For example, the temperature values may be inverse temperatures $\beta_1, \beta_2, \ldots, \beta_N$ ($\beta_i=1/T_i$), which are reciprocals of temperatures $T_1, T_2, \ldots, T_N$.

The temperature controller 22 sets the determined temperature value for each of the search units 10a1 to 10aN.

The exchange controller 23 replaces the temperature values or the values of the plurality of state variables among the plurality of search units after the energy value ground state search is repeated a predetermined number of times or after a predetermined period of time elapses. The exchange controller 23 acquires energy values $E_1, E_2, \ldots, E_N$ from the search units 10a1 to 10aN, respectively, and, as described above, determines whether to replace the temperature values between the search units, based on the equation (5). Alternatively, instead of determining whether to replace the temperature values between the search units, the exchange controller 23 may determine whether to replace the values of the plurality of state variables between the search units, based on the equation (5).

Here, an example of temperature determination by the temperature adjustment unit 21 will be described. For example, the temperature adjustment unit 21 may set, in each of the search units 10a1 to 10aN, a temperature value corresponding to the maximum value of the appearance frequency in the temperature frequency information obtained by counting the appearance frequency of each temperature value with respect to the transition of the temperature value in the acquired temperature statistical information.

More specifically, when the minimum value of the energy value is updated in any of the search units, the temperature adjustment unit 21 acquires, as temperature statistical information, the highest temperature value among the temperatures set in the corresponding search unit from the previous update to the current update of the minimum value of the energy value. For example, the temperature adjustment unit 21 specifies a temperature value having the highest appearance frequency in a histogram obtained by counting the appearance frequency of the acquired temperature value for each temperature value, and calculates the temperature value set in each of the search units 10a1 to 10aN, based on the specified temperature value.

In an example, the temperature adjustment unit 21 calculates the i-th temperature tmp[i] (i=1, 2, . . . , N) out of N temperature values according to the following equations (6) and (7).

[Equation 6]

$$tmp[i] = tmp\_min \cdot \exp\left(\frac{i-1}{denom}\right) \quad (6)$$

[Equation 7]

$$denom = \frac{N-1}{\log\left(\frac{tmp\_max}{tmp\_min}\right)} \quad (7)$$

The max_tmp is the maximum value of the set temperature and is the temperature value having highest appearance frequency in the histogram. The min_tmp is the minimum value of the set temperature and is given in advance. Thus, the temperature adjustment unit 21 determines the maximum value max_tmp of the temperature value from the acquired temperature statistical information, and determines a temperature value to be set in each of the search units 10a1 to 10aN based on the maximum value max_tmp. The reason why the maximum value max_tmp of the set temperature is the temperature value having the highest appearance frequency in the temperature statistical information as described above is that it is estimated that there is a high possibility of updating the minimum value of the energy value of the search unit by using the temperature value having the highest appearance frequency as the maximum value. However, the maximum value max_tmp may be, for example, a temperature that is higher by a predetermined value (or a predetermined ratio) than the temperature value having the highest appearance frequency.

Alternatively, the temperature adjustment unit 21 sets, in each of the search units 10a1 to 10aN, a temperature value corresponding to the frequency obtained by multiplying the maximum value of the cumulative frequency by a predetermined coefficient in temperature cumulative frequency information that indicates the cumulative frequency of accumulation of the appearance frequencies of each temperature value regarding the transition of the temperature value in the acquired temperature statistical information.

More specifically, the temperature adjustment unit 21 acquires, as the temperature cumulative frequency information, a cumulative frequency obtained by accumulating the appearance frequency of each temperature value in the histogram from the smaller temperature value. Then, the temperature adjustment unit 21 specifies a temperature value corresponding to the frequency obtained by multiplying the maximum value of the cumulative frequency in the cumulative histogram representing the cumulative frequency by a predetermined coefficient, and calculates a temperature value to be set in each of the search units 10a1 to 10aN based on the specified temperature value. That is, the temperature adjustment unit 21 calculates a temperature tmp[i] using the specified temperature value as the maximum value max_tmp according to the equations (6) and (7).

In addition, the temperature tmp[i] (temperature value) determined by the temperature adjustment unit 21 may be set by the temperature controller 22 in each of the search units 10a1 to 10aN. In addition, the temperature adjustment unit 21 acquires the energy value from each of the search units 10a1 to 10aN after the energy value ground state search is repeated a predetermined number of time or after a predetermined period of time elapses, and checks for each of the search units whether the minimum value of the energy value has been updated. For example, the temperature adjustment unit 21 checks whether the minimum value of the energy value has been updated, before replacement the temperature values (or the state variable values) between the search units by the exchange controller 23 after the energy value ground state search is repeated a predetermined number of time or after a predetermined period of time elapses.

Then, the temperature adjustment unit 21 acquires temperature statistical information in a predetermined period in which a first temperature value is set in each of the search units 10a1 to 10aN. After the predetermined period ends, the temperature adjustment unit 21 determines a second temperature value to be set in each of the search units 10a1 to 10aN based on the temperature statistical information.

For example, the temperature adjustment unit 21 acquires the temperature statistical information in an initial portion of the entire period of the ground state search by the search units 10a1 to 10aN, and determines the temperature tmp[i] based on the temperature statistical information. Using the determined temperature tmp[i], the controller 20 continues the ground state search by the search units 10a1 to 10aN in the remaining period.

Alternatively, the temperature adjustment unit 21 may acquire the temperature statistical information for each predetermined partial period with respect to the entire period of the ground state search by the search units 10a1 to 10aN, and determine the temperature tmp[i] after the partial period. Then, using the temperature tmp[i] determined based on the temperature statistical information acquired in the previous partial period in the next partial period, the controller 20 may continue the ground state search by the search units 10a1 to 10aN.

Here, the "period" may be determined by the number of repetitions of the ground state search by the search units 10a1 to 10aN, or may be determined by a time interval.

Meanwhile, it is conceivable to perform the optimization operation using the replica exchange method as described above. The replica exchange method is a method of performing the ground state search at different temperatures in systems called multiple replicas and exchanging, for example, temperatures or states (plural state variable values) of adjacent systems in a certain period according to a transition probability determined from energy and temperature. According to the replica exchange method, even when the temperature drops and the solution falls into a local solution, the global solution may be searched again by raising the temperature once by replica exchange, thereby obtaining a solution at a high speed without considering a complicated temperature scheduling. However, it is necessary to appropriately determine a temperature to be set for each replica, and, when the temperature (particularly, the maximum value of the temperature) is too high or too low, the solution accuracy is lowered, which may cause a problem that it takes a long time to search. In addition, when the optimization calculation is performed many times with several temperature parameters in order to appropriately determine the temperature, it takes a lot of time and effort, which may cause a problem of impairing the user' convenience.

As described above, the optimization device 1 acquires the statistical information of the highest temperature reached by a replica (e.g., a search unit) while the lowest energy of the replica is being updated, and determines a set temperature of each of the search units 10a1 to 10aN based on the statistical information. In this manner, the optimization device 1 may improve the solution accuracy by adaptively determining a temperature used for the subsequent calculation based on the temperature statistical information acquired in the actual calculation process. In addition, the calculation speed may be increased. That is, the solution solving performance is improved. Further, the labor of temperature adjustment may be saved, thereby improving the user' convenience.

Next, a circuit configuration example of the optimization device 1 will be described. A case where an optimization problem is represented by an Ising model will be exemplified below. First, a case where temperatures in the search units 10a1 to 10aN are exchanged will be exemplified. Thereafter, as a second embodiment, a case where the values of a plurality of state variables in the search units 10a1 to 10aN are exchanged will be exemplified.

Figure 2:
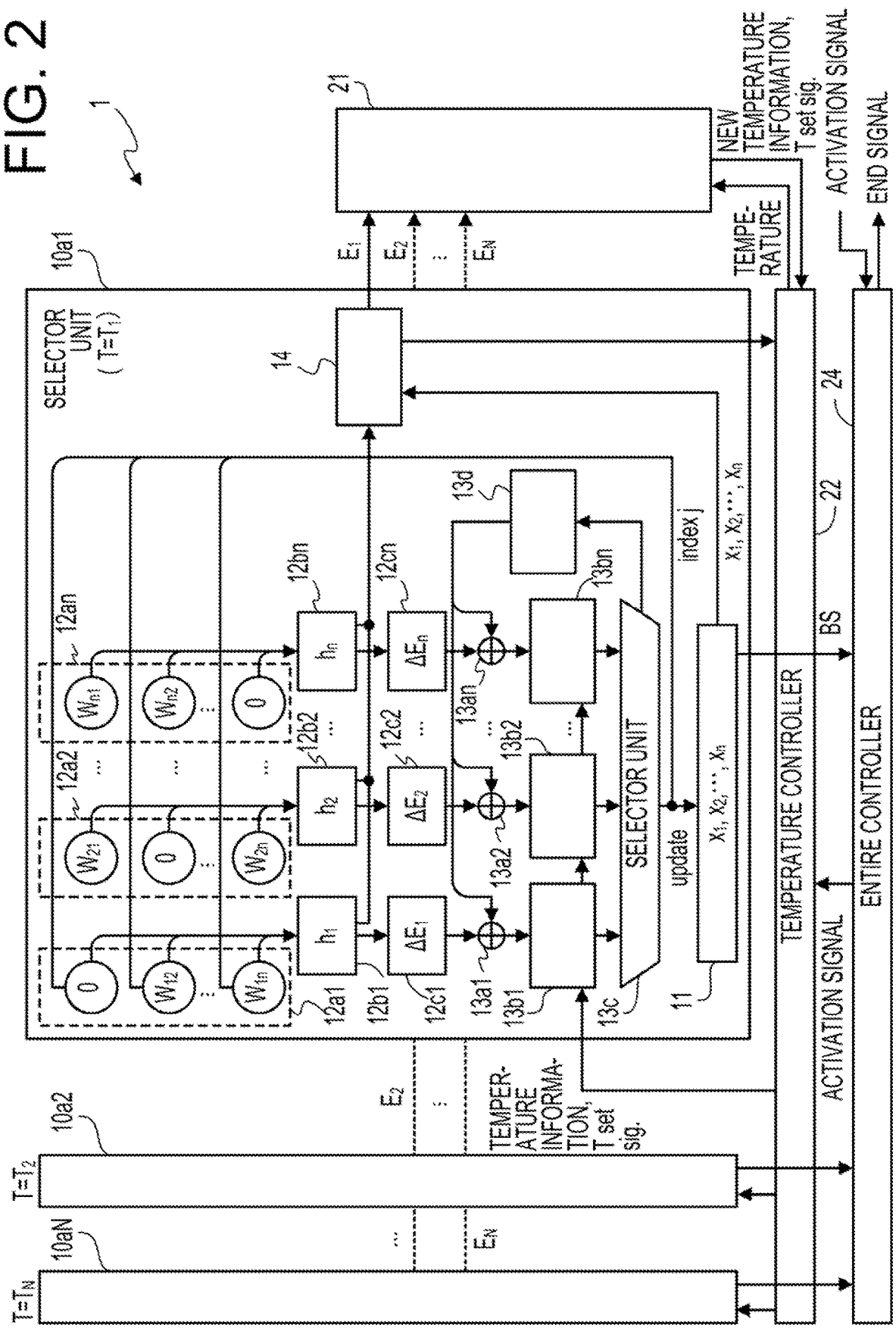
FIG. 2 is a view illustrating a circuit configuration example of the optimization device.

FIG. 2 is a view illustrating a circuit configuration example of an optimization device.

The optimization device 1 searches for a value (ground state) of each spin bit when an evaluation function has the minimum value, among the combinations (states) of values of a plurality of spin bits corresponding to a plurality of spins included in an Ising model into which an optimization problem of a calculation target is converted.

The Ising-type evaluation function E(x) is defined by, for example, the following equation (8).

[Equation 8]

$$E(x) = -\sum_{<i,j>} W_{ij} x_i x_j - \sum_i b_i x_i \qquad (8)$$

The first item on the right side is an integration of products of values (0 or 1) of two spin bits and coupling factors, for all combinations of two spin bits that may be selected from all spin bits included in the Ising model, without omission and duplication. It is assumed that the total number of spin bits included in the Ising model is n (n is an integer of 2 or more). For example, n is equal to 1024. It is also assumed that each of i and j is an integer of 1 to n. The sign $x_i$ is a variable (also referred to as a state variable) representing the value of the i-th spin bit. The sign $x_j$ is a variable representing the value of the j-th spin bit. The sign $W_{ij}$ is a weighting factor representing the magnitude of interaction between the i-th bit and the j-th bit. Further, $W_{ii}$ is zero (0). The sign "$W_{ij}$" may be often equal to $W_{ji}$ (i.e., a factor matrix by weighting factors is often a symmetric matrix).

The second item on the right side is the sum of the products of bias factors of all the spin bits and the values of the spin bits. The sign $b_i$ represents a bias factor of the i-th spin bit.

In addition, when the value of the variable $x_i$ changes to $1-x_i$, the increment of the variable $x_i$ may be expressed as $\delta x_i = (1-x_i) - x_i = 1-2x_i$. Accordingly, the energy change $\Delta E_i$ accompanying the spin inversion (change in value) is expressed by the following equation (9).

[Equation 9]

$$\begin{aligned}\Delta E_i &= E(x)|_{x_i \to 1-x_i} - E(x) \\ &= -\delta x_i \left( \sum_j W_{ij} x_j + b_i \right) \\ &= -\delta x_i h_i \\ &= \begin{cases} -h_i & (\text{for } x_i = 0 \to 1) \\ +h_i & (\text{for } x_i = 1 \to 0) \end{cases}\end{aligned} \qquad (9)$$

The sign $h_i$ is called a local field and is expressed by the following equation (10).

[Equation 10]

$$h_i = \sum_j W_{ij} x_j + b_i \qquad (10)$$

The energy change $\Delta E_i$ is obtained by multiplying the local field $h_i$ by a sign (+1 or −1) according to $\delta x_i$. The amount of change $\delta h_i^{(j)}$ of the local field $h_i$ when a certain variable $x_j$ changes is expressed by the following equation (11).

[Equation 11]

$$\delta h_i^{(j)} = \begin{cases} +W_{ij} & (\text{for } x_j = 0 \to 1) \\ -W_{ij} & (\text{for } x_j = 1 \to 0) \end{cases} \qquad (11)$$

A process of updating the local field when a certain variable $x_j$ changes is performed in parallel for each variable.

The optimization device 1 is implemented by using a semiconductor integrated circuit such as an FPGA (Field Programmable Gate Array). The optimization device 1 includes an entire controller 24 in addition to the search units 10a1 to 10aN, the temperature adjustment unit 21, the temperature controller 22, and the exchange controller 23 illustrated in FIG. 1. In the example of FIG. 2, since the exchange controller 23 is included in the temperature controller 22, the illustration of the exchange controller 23 is omitted.

Each of the search units 10a1 to 10aN implements a ground state search based on the Ising-type evaluation function expressed by the equation (8) with a circuit described below. The search unit 10a1 will be mainly described below, but the search units 10a2 to 10aN have the same circuit configuration.

The search unit 10a1 includes a state holding unit 11, registers 12a1, 12a2, . . . , 12an, h calculation units 12b1, 12b2, . . . , 12bn, ΔE generation units 12c1, 12c2, . . . , 12cn, adders 13a1, 13a2, . . . , 13an, state transition determination circuits 13b1, 13b2, . . . , 13bn, a selector unit 13c, an offset controller 13d, and an E calculation unit 14.

In FIG. 2, for the h calculation units 12b1 to 12bn, a name is given with a subscript like "$h_i$," calculation unit so that it may be easily understood that the name corresponds to the i-th spin bit. Further, in FIG. 2, for the ΔE generation units 12c1 to 12cn, a name is given with a subscript like "$\Delta E_i$," calculation unit so that it may be easily understood that the name corresponds to the i-th spin bit.

A determination as to whether to invert any of spin bits included in a spin bit string in a certain search unit and a process of inverting the corresponding spin bit when an inversion is performed correspond to a one-time process of ground state search (also referred to as a stochastic search) by the corresponding search unit.

The registers 12a1 to 12an, the h calculation units 12b1 to 12bn, and the ΔE generation units 12c1 to 12cn correspond to the energy calculation unit 12. That is, the energy calculation unit 12 includes the registers 12a1 to 12an, the h calculation units 12b1 to 12bn, and the ΔE generation units 12c1 to 12cn. Further, the adders 13a1 to 13an, the state transition determination circuits 13b1 to 13bn, the selector unit 13c, and the offset controller 13d correspond to the transition controller 13. That is, the transition controller 13 includes the adders 13a1 to 13an, the state transition determination circuits 13b1 to 13bn, the selector unit 13c, and the offset controller 13d.

Among the n spin bits, the register 12a1, the h calculation unit 12b1, the ΔE generation unit 12c1, the adder 13a1, and the state transition determination circuit 13b1 perform an operation related to the first spin bit. In addition, the register 12a2, the h calculation unit 12b2, the ΔE generation unit 12c2, the adder 13a2, and the state transition determination circuit 13b2 perform an operation related to the second spin bit. Similarly, the numerical value i at the end of the reference numeral such as "12a1" or "12b1" indicates that an operation corresponding to the i-th spin bit is performed. That is, a single search unit has n sets of a register, an h calculation unit, a ΔE generation unit, an adder, and a state transition determination circuit (one set is one unit of an arithmetic processing circuit that performs an operation related to one spin bit, and is referred to as a "neuron"). n sets perform operations related to spin bits corresponding to each set in parallel.

In the following, description will be given mainly by exemplifying the register 12a1, the h calculation unit 12b1, the ΔE generation unit 12c1, the adder 13a1, and the state transition determination circuit 13b1. The registers 12a2 to 12an, the h calculation units 12b2 to 12bn, the ΔE generation units 12c2 to 12cn, the adders 13a2 to 13an, and the state transition determination circuits 13b2 to 13bn that have the same names also have the same functions.

Here, spin bits that correspond to the set of the register 12a1, the h calculation unit 12b1, the ΔE generation unit 12c1, the adder 13a1, and the state transition determination circuit 13b1 are referred to as the own spin bits, and the other spin bits calculated by the search unit 10a1 are referred to as other spin bits. Each spin bit is identified by identification information called an index. For example, the index of the i-th spin bit is i.

The register 12a1 stores a weighting factor $W_{1j}$ (j=1 to n) between an own spin bit and another spin bit. Here, the total number of weighting factors is $n^2$ for the number of spin bits n. n weighting factors are stored in the register 12a1. The subscript i of the weighting factor $W_{ij}$ indicates the index of the own spin bit, and the subscript j indicates the index of any of spin bits including the own spin bit.

The register 12a1 stores n weighting factors $W_{11}$i, $W_{12}, \ldots, W_{1n}$ for the own spin bit. Further, $W_{ii}=W_{11}=0$. The register 12a1 outputs, to the h calculation unit 12b1, a weighting factor $W_{ij}$ corresponding to an index=j output from the selector unit 13c.

The h calculation unit 12b1 calculates the local field $h_1$ based on the equations (10) and (11) using the weighting factor $W_{1j}$ supplied from the register 12a1. For example, the h calculation unit 12b1 has a register that holds the previously calculated local field $h_1$, and updates $h_1$ stored in the register by multiplying $h_1$ by $\delta h_1^{(j)}$ corresponding to the inversion direction of a spin bit indicated by index=j. A signal indicating the inversion direction of the spin bit indicated by index=j may be supplied from the state holding unit 11 to the h calculation unit 12b1. The initial value of $h_1$ is preset in the register of the h calculation unit 12b1 according to a problem. The value of $b_1$ is also preset in the register of the h calculation unit 12b1 according to a problem. The h calculation unit 12b1 outputs the calculated local field $h_1$ to the ΔE generation unit 12c1 and the E calculation unit 14.

The ΔE generation unit 12c1 generates the energy change value $\Delta E_1$ of the Ising model according to the inversion of the own spin bit based on the equation (9) using the local field $h_1$. For example, the ΔE generation unit 12c1 may determine the inversion direction of the own spin bit from the current value of the own spin bit supplied from the state holding unit 11 (when the current value is 0, 0 to 1 is the inversion direction, and when the current value is 1, 1 to 0 is the inversion direction). The ΔE generation unit 12c1 outputs the generated energy change value $\Delta E_1$ to the adder 13a1. Here, according to an addition process in the adder 13a1 at the subsequent stage and a determination process in the state transition determination circuit 13b1, the ΔE generation unit 12c1 may output, to the adder 13a1, an energy change value $-\Delta E_1$ obtained by reversing the sign of the energy change value $\Delta E_1$. In this example, it is assumed that the ΔE generation unit 12c1 outputs $-\Delta E_1$ as an energy change value to the adder 13a1.

The adder 13a1 adds $-\Delta_1$ supplied from the ΔE generation unit 12c1 and an offset value $E_{off}$ supplied from the offset controller 13d. As will be described later, the offset value $E_{off}$ is a parameter that prompts state transition and is controlled by the offset controller 13d. In this example, $E_{off} \geq 0$. The adder 13a1 outputs the addition result $(-\Delta E_1 + E_{off})$ to the state transition determination circuit 13b1.

The state transition determination circuit 13b1 outputs, to the selector unit 13c, a flag $f_1$ indicating whether the own spin bit may be inverted, according to the sum $(-\Delta E_1 + E_{off})$ of the energy change value supplied from the adder 13a1 and the offset value $\Delta E_{off}$. Specifically, the state transition determination circuit 13b1 determines whether the own spin bit may be inverted, according to a comparison between $-\Delta E_1 + E_{off}$ and a threshold.

Here, the determination by the state transition determination circuit 13b1 will be described.

In simulated annealing, the state transition permissible probability $p(\Delta E, T)$ that causes a certain energy change ΔE is determined as in the above-described equation (1). In the equation (1), T is the aforementioned temperature information T. The temperature information T is set in the state transition determination circuit 13b1 by the temperature controller 22. As the function f, the equation (2) (Metropolis method) or the equation (3) (Gibbs method) is used.

For example, a circuit that outputs a flag (flg=1) indicating that a state transition that causes an energy change ΔE with a permissible probability $p(\Delta E, T)$ may be implemented by a comparator that outputs a value according to a comparison between $f(-\Delta E/T)$ and an uniform random number u taking a value of an interval [0, 1].

However, the same function may be implemented even when the following modification is made. Even when the same monotonically increasing function is applied to two numbers, the magnitude relationship does not change. Therefore, the output of the comparator does not change even when the same monotonically increasing function is applied to the two inputs of the comparator. For example, the reverse function $f^{-1}(-\Delta E/T)$ of $f(-\Delta E/T)$ may be used as a monotonically increasing function acting on $f(-\Delta E/T)$, and $f^{-1}(u)$ where u is $-\Delta E/T$ in $f^{-1}(-\Delta E/T)$ may be used as a monotonically increasing function acting on the uniform random number u. In that case, it may be understood that a circuit having the same function as the above-described comparator may be a circuit that outputs 1 when $-\Delta E/T$ is larger than $f^{-1}(u)$. Furthermore, since the temperature parameter T is positive, the state transition determination circuit 13b1 may be a circuit that outputs flag=1 when $-\Delta E$ is equal to or larger than $T \cdot f^{-1}(u)$ (or when ΔE is equal to or smaller than $-(T \cdot f^{-1}(u))$).

The state transition determination circuit 13b1 generates a uniform random number u and generates a value of $f^{-1}(u)$ using a conversion table that converts the uniform random number u into the value of $f^{-1}(u)$. When the Metropolis method is applied, $f^{-1}(u)$ is given by the following equation (12). When the Gibbs method is applied, $f^{-1}(u)$ is given by the following equation (13).

[Equation 12]
$$f_{metro}^{-1}(u) = \log(u) \quad (12)$$

[Equation 13]
$$f_{Gibbs}^{-1}(u) = \log\left(\frac{u}{1-u}\right) \quad (13)$$

The conversion table is stored in, for example, a register included in the state transition determination circuit 13b1. The state transition determination circuit 13b1 generates a product $(T \cdot f^{-1}(u))$ of the temperature parameter T and $f^{-1}(u)$ as a threshold, and compares the product with $-\Delta E_1 + E_{off}$. Here, $T \cdot f^{-1}(u)$ corresponds to thermal excitation energy. The state transition determination circuit 13b1 outputs a flag $f_1=1$ (transition possible) to the selector unit 13c when $(-\Delta E_1 + E_{off}) \geq T \cdot f^{-1}(u)$. The state transition determination circuit 13b1 outputs a flag $f_1=0$ (transition impossible) to the selector unit 13c when $(-\Delta E_1 + E_{off}) < T \cdot f^{-1}(u)$.

The selector unit 13c receives flags indicating whether the transition is possible, which are output from the state transition determination circuits 13b1 to 13bn. When there are flags indicating that the transition is possible among the flags output from the state transition determination circuits 13b1 to 13bn, the selector unit 13c selects any one flag indicating that the transition is possible. When there is no flag indicating that the transition is possible among the flags output from the state transition determination circuits 13b1 to 13bn, the selector unit 13c selects one predetermined flag.

The selector unit 13c outputs, to the state holding unit 11, an update signal (update) including a flag indicating whether the transition is possible and an index=j indicating a spin bit corresponding to the selected flag. At the same time, the selector unit 13c outputs, to the offset controller 13d, a flag indicating whether the selected transition is possible, and outputs an index=j corresponding to the selected flag to each of the registers 12a1 to 12an.

The offset controller 13d controls an offset value supplied to each of the adders 13a1 to 13an based on the flag indicating whether the transition is possible, which is output from the selector unit 13c. Specifically, the offset controller 13d resets the offset value to 0 when the flag output from the selector unit 13c indicates that the transition is possible. When the flag output from the selector unit 13c indicates that the transition is not possible, the offset controller 13d adds an increment value $\Delta E_{off}$ to the offset value. When the flag continuously indicates that the transition is not possible, the offset controller 13d integrates $\Delta E_{off}$ to increase $E_{off}$ by $\Delta E_{off}$.

When the flag output from the selector unit 13c indicates that the transition is not possible, it may be considered that the current state falls into a local solution. By the addition of the offset value to $-\Delta E_1$ or the increase in the offset value, the state transition is easily permitted, and when the current state is in the local solution, escape from the local solution is promoted.

The state holding unit 11 updates the bit states ($x_1$, $x_2$, ..., $x_n$) held by the registers included in the state holding unit 11 based on the flag and the index output from the selector unit 13c. Here, a bit state is a spin bit string (values of a plurality of state variables) including n spin bits in the search unit 10a1. In the figure, the bit state may be abbreviated as a BS (Bit State). The state holding unit 11 outputs the current bit state to the E calculation unit 14. The state holding unit 11 outputs the bit state at the time of completion of the search process in the search unit 10a1 to the entire controller 24.

The E calculation unit 14 calculates the current energy value $E_1$ of the Ising model in the search unit 10a1 based on the local fields $h_1$ to $h_n$ output respectively from the h calculation units 12b1 to 12bn and the bit states ($x_1$ to $x_n$) output from the state holding unit 11. The energy value $E_1$ is an energy value (sometimes simply referred to as energy) defined by the evaluation function of the equation (8). The E calculation unit 14 outputs the calculated energy value $E_1$ to the temperature adjustment unit 21. Further, when the search process of a predetermined number of times or a predetermined period in the search unit 10a1 is completed, the E calculation unit 14 outputs the calculated energy value $E_1$ to the temperature controller 22.

The temperature adjustment unit 21 receives the energy values $E_1$ to $E_N$ output respectively from the search units 10a1 to 10aN. Further, the temperature adjustment unit 21 acquires information on the temperature set in each of the search units 10a1 to 10aN from the temperature controller 22. FIG. 2 illustrates an example in which the temperature $T_1$ is set in the search unit 10a1, the temperature $T_2$ is set in the search unit 10a2, . . . , the temperature $T_N$ is set in the search unit 10aN. The temperature adjustment unit 21 determines new temperature information indicating new temperatures to be set in each of the search units 10a1 to 10aN according to changes in the energy values $E_1$ to $E_N$ and changes in the temperatures set in the search units 10a1 to 10aN. The temperature adjustment unit 21 outputs the determined new temperature information and a new temperature setting signal (T set sig. (the sign "sig." is an abbreviation of signal)) to the temperature controller 22.

The temperature controller 22 controls the temperature supplied to each of the search units 10a1 to 10aN. The temperature controller 22 supplies temperature information indicating the temperature and a temperature setting signal (T set sig.) to the state transition circuit included in each of the search units 10a1 to 10aN. Further, the temperature controller 22 has the function of the exchange controller 23, and controls exchange of temperature (temperature exchange) in the search units 10a1 to 10aN (the illustration of the exchange controller 23 is omitted in FIG. 2). The exchange controller 23 determines whether to perform a temperature exchange with respect to a pair of search units (two search units) based on the exchange probability of the equation (5). The temperature controller 22 supplies the temperature after replacement to each search unit.

For example, the exchange controller 23 holds first association information in which temperature identification information (referred to as a temperature index or a temperature number) and temperature are associated with each other in a register included in the exchange controller 23. For example, the temperature index is associated with the temperature in ascending order of temperature (as the temperature index becomes higher, the temperature becomes higher). Further, the exchange controller 23 holds second association information in which temperature indexes arranged in ascending order and the identification number of each of the search units 10a1 to 10aN are associated with each other in a register included in the exchange controller 23. In this case, the set temperature is adjacent to the pair of search units corresponding to an adjacent temperature index in the second association information. The exchange controller 23 controls the temperature exchange for the search units 10a1 to 10aN based on the first association information and the second association information, and updates the second association information according to the exchange. The temperature controller 22 supplies the temperature to each search unit based on the first association information and the second association information. The temperature associated with the temperature index in the first association information is updated according to the calculation result of the new temperature by the temperature adjustment unit 21.

However, the exchange controller 23 may also specify a pair of search units holds to which the set temperature is adjacent, by holding the association information that associates the identification number of each of the search units 10a1 to 10aN with the temperature value, and sorting the association information by the temperature value. In this case, the temperature value in the association information is updated according to the calculation result of the new temperature by the temperature adjustment unit 21.

The entire controller 24 controls the entire operation of the optimization device 1. When receiving an activation signal, the entire controller 24 outputs the activation signal to the temperature controller 22 and activates the search units 10a1 to 10aN to start the calculation of the ground state search related to the optimization problem. When the calculation is ended, the entire controller 24 acquires a bit state from each of the search units 10a1 to 10aN to obtain a solution for the optimization problem. The entire controller 24 outputs an end signal indicating the end of the calculation. The end signal may include information indicating a solution obtained by the calculation. For example, the entire controller 24 may output image information indicating the solution to a display device connected to the optimization device 1 and display the image information indicating the solution on the display device so that the contents of the obtained solution may be presented to a user.

Next, the circuit configuration of the state transition determination circuits 13b1 to 13bn will be described. Hereinafter, the state transition determination circuit 13b1 will be described as an example, but the other state transition determination circuits have the same circuit configuration.

Figure 3:
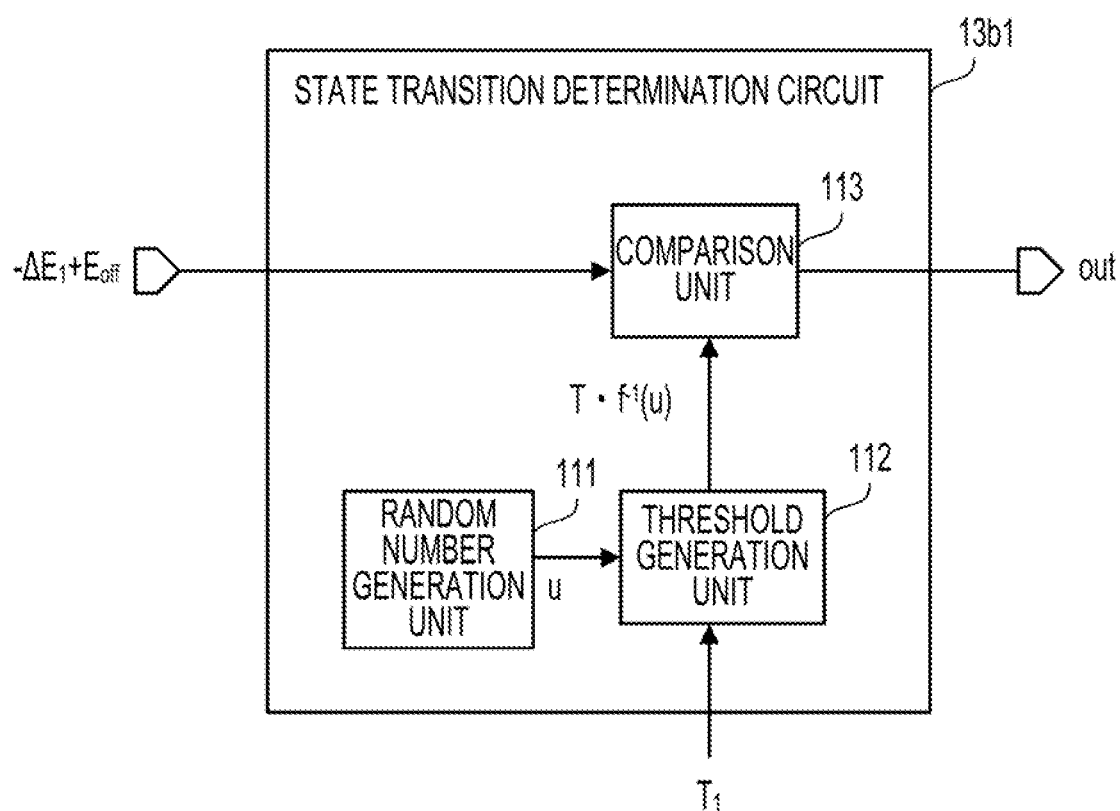
FIG. 3 is a view illustrating a circuit configuration example of a state transition determination circuit.

FIG. 3 is a view illustrating a circuit configuration example of a state transition determination circuit.

The state transition determination circuit 13b1 includes a random number generation unit 111, a threshold generation unit 112, and a comparison unit 113.

The random number generation unit 111 generates a uniform random number u and outputs the uniform random number u to the threshold generation unit 112.

The threshold generation unit 112 uses the uniform random number u and the temperature information indicating the temperature $T_1$ supplied by the temperature controller 22 to generate a threshold $T \cdot f^{-1}(u)$ based on the equation (12) (or the equation (13)) according to the above-described conversion table. The threshold generation unit 112 outputs the generated threshold $T \cdot f^{-1}(u)$ to the comparison unit 113.

The comparison unit 113 compares $(-\Delta E_1 + E_{off})$ output from the adder 13a1 with the threshold $T \cdot f^{-1}(u)$ to output a flag indicating whether transition is possible to the selector unit 13c. As described above, for example, the comparison unit 113 outputs transition possibility to the selector unit 13c when $(-\Delta E_1 + E_{off}) \geq T \cdot f^{-1}(u)$. The state transition determination circuit 13b1 outputs transition impossibility to the selector unit 13c when $(-\Delta E_1 + E_{off}) < T \cdot f^{-1}(u)$.

Next, a circuit configuration example of the selector unit 13c will be described.

Figure 4:
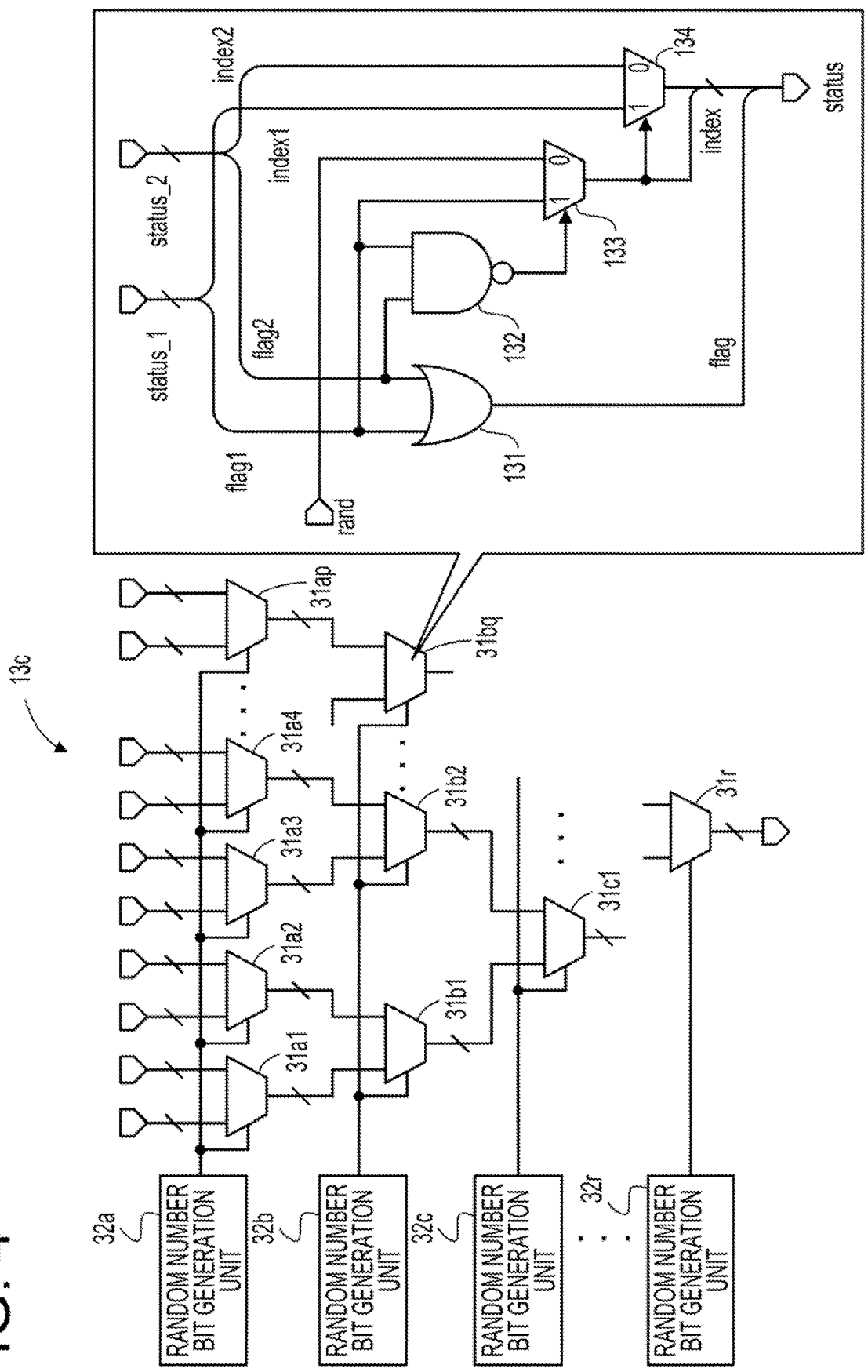
FIG. 4 is a view illustrating a circuit configuration example of a selector unit.

FIG. 4 is a view illustrating a circuit configuration example of selector unit.

The selector unit 13c includes a plurality of selection circuits connected in a tree shape over a plurality of stages, and random number bit generation units 32a, 32b, 32c, . . . , 32r. The random number bit generation units 32a to 32r are respectively installed for the plurality of stages of selection circuits connected in a tree shape. Each of the random number bit generation units 32a to 32r generates a 1-bit random number taking a value of 0 or 1, and supplies the 1-bit random number to selection circuits at each stage. The 1-bit random number is used to select one flag in an input flag pair.

A set of flags indicating whether transition is possible, which is output from each of the state transition determination circuits 13b1 to 13bn, is input to each of the selection circuits 31a1, 31a2, 31a3, 31a4, . . . , 31ap at the initial stage. For example, a pair of a flag output from the first state transition determination circuit 13b1 and a flag output from the second state transition determination circuit 13b2 is input to the selection circuit 31a1. A pair of a flag output from the third state transition determination circuit and a flag output from the fourth state transition determination circuit is input to the selection circuit 31a2. Thereafter, similarly, a pair of a flag output from the (n−1)-th state transition determination circuit and a flag output from the n-th state transition determination circuit 13bn is input to the selection circuit 31ap. Thus, a pair with the flag output by the adjacent state transition determination circuit is input to the selection circuits at the initial stage. The number of the selection circuits 32a1 to 31ap at the initial stage is n/2. Thereafter, the number of the selection circuits is halved each time a stage is passed.

Each of the selection circuits 31a1 to 31ap selects one flag in the input flag pair based on the input flag pair and the 1-bit random number output from the random number bit generation unit 32a. Each of the selection circuits 31a1 to 31ap outputs a status signal including the selected flag and a 1-bit identification value corresponding to the selected flag to the second-stage selection circuits 31b1 to 31bq. For example, a status signal output from the selection circuit 31a1 and a status signal output from the selection circuit 31a2 are input to the selection circuit 31b1. Similarly, a pair of status signals output from the selection circuits adjacent to the selection circuits 31a1 to 31ap is input to the second-stage selection circuits.

Each of the selection circuits 31b1 to 31bq selects one of the input status signals based on the input status signal pair and the 1-bit random number output from the random number bit generation unit 32b. Each of the selection circuits 31b1 to 31bq outputs the selected status signal to the third-stage selection circuits 31c1, . . . . Here, the selection circuits 31b1 to 31bq update the status signal included in the selected status signal by adding 1 bit to indicate which status signal is selected, and output the selected status signal.

The same process is performed for the selection circuits at the third and subsequent stages such that the bit width of the identification value is increased bit by bit in the selection circuits in each stage and a status signal serving as an output of the selector unit 13c is output from the final-stage selection circuit 13r. An identification value included in the status signal output from the selector unit 13c corresponds to an index expressed in binary. However, in the circuit configuration example illustrated in FIG. 4, the index of the search unit is set to 0 to 1023. A value obtained by adding 1 to the identification value output from the selection circuit 31r corresponds to j illustrated in FIG. 2.

For example, FIG. 4 illustrates a circuit configuration example of the selection circuit 31bq. Other selection circuits after the second stage are also implemented by the same circuit configuration as the selection circuit 31bq.

The input of the selection circuit 31bq is a first status signal (status_1) and a second status signal (status_2). The output of the selection circuit 31b1 is a status signal (status). The selection circuit 31bq includes an OR circuit 131, a NAND circuit 132, and selectors 133 and 134.

A flag (flag1) included in the status signal (status_1) and a flag (flag2) included in the status signal (status_2) are input to the OR circuit 131. For example, the status signal (status_1) is the output of the upper side (one with a larger index) of two selection circuits at the previous stage, and the status signal (status_2) is the output of the lower side (one with a lower index) of the two selection circuits at the previous stage. The OR circuit 131 outputs an OR operation result (flag) of flag1 and flag2.

The flag1 and flag2 are input to the NAND circuit 132. The NAND circuit 132 outputs the NAND operation result of flag1 and flag2 to the selection signal input terminal of the selector 133.

The flag1 and a 1-bit random number (rand) are input to the selector 133. The selector 133 selects and outputs one of flag1 and rand based on the NAND operation result input from the NAND circuit 132. For example, the selector 133 selects flag1 when the NAND operation result of the NAND circuit 132 is "1", and selects rand when the NAND operation result of the NAND circuit 132 is "0".

The index1 included in the status signal (status_1) and index2 included in the status signal (status_2) are input to the selector 134. The selection result of the selector 133 is input to the selection signal input terminal of the selector 134. The selector 134 selects and outputs one of index1 and index2 based on the selection result of the selector 133. For example, the selector 134 selects index1 when the selection result of the selector 133 is "1", and selects index2 when the selection result of the selector 133 is "0".

A set of outputs of the OR circuit 131 and the selectors 133 and 134 is a status signal (status) output from the selection circuit 31bq.

Further, the input of the initial-stage selection circuit does not include an identification value. For this reason, the initial-stage selection circuit is a circuit that adds and outputs a bit value ("0" for the lower side and "1" for the upper side) corresponding to the selected one as an identification value (indicated as an index in the figure).

In this way, the selector unit 13c selects one of spin bits that may be transitioned, in a tournament manner. In each tournament game (i.e., selection in each selection circuit), the entry number (0 or 1) of the winning one (i.e., the selected one) is added to the upper bit of an index word. An index output from the final-stage selection circuit 31r indicates a selected spin bit. For example, when the number of spin bits in one search unit is 1024, the status signal output by the final-stage selection circuit 31r includes a flag indicating whether transition is possible and an index represented by 10 bits.

However, an index output method other than the method of generating an index in the selector unit 13c as described above may be considered. For example, an index corresponding to each state transition determination circuit may be supplied from each of the state transition determination circuits 13b1 to 13bn to the selector unit 13c, and a flag indicating whether transition is possible and an index corresponding to the flag may be selected by the selector unit 13c. In this case, each of the state transition determination circuits 13b1 to 13bn further includes an index register that stores an index corresponding to its own, and supplies the index from the index register to the selector unit 13c.

Figure 5:
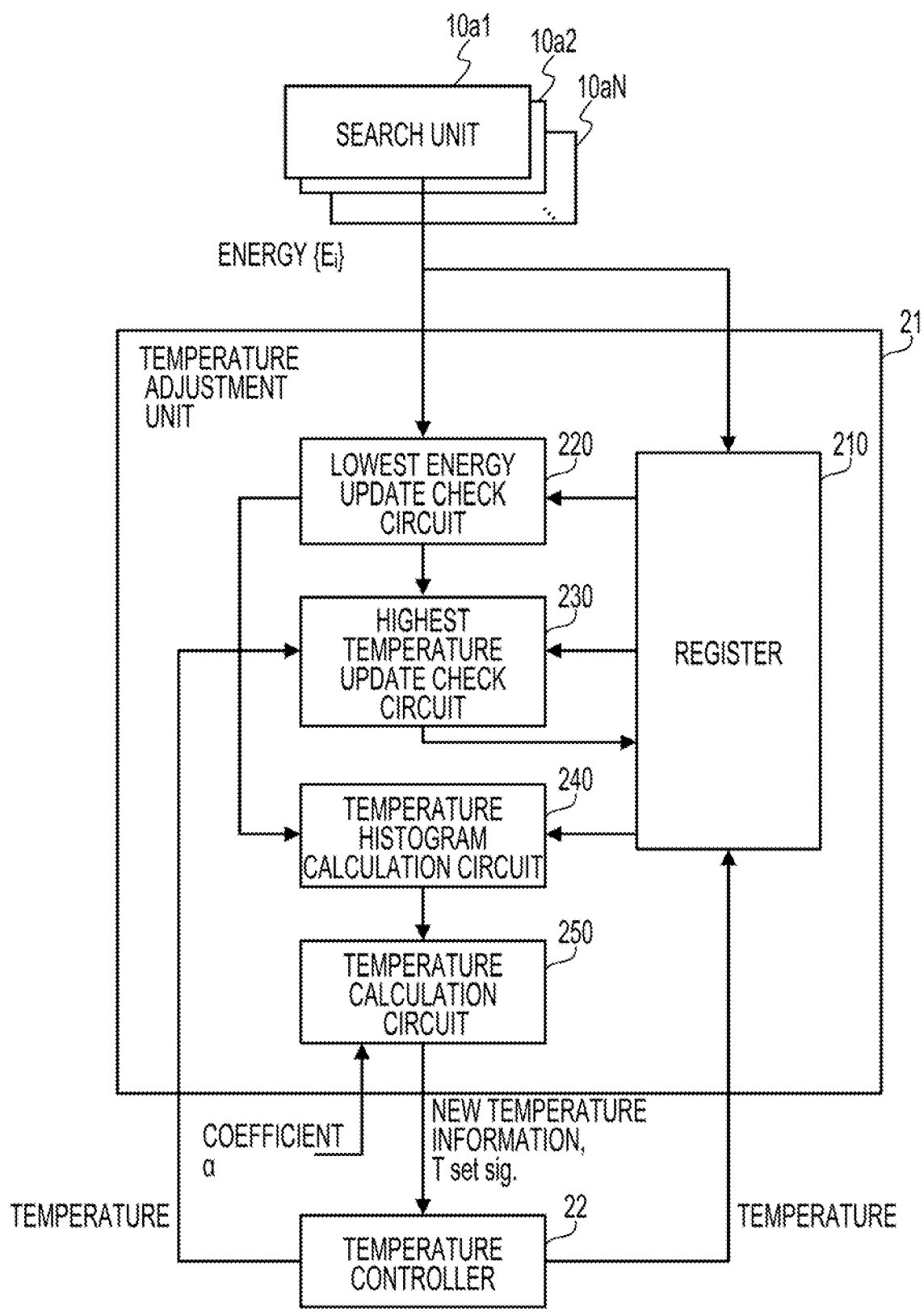
FIG. 5 is a view illustrating a circuit configuration example of a temperature adjustment unit.

FIG. 5 is a view illustrating a circuit configuration example of a temperature adjustment unit.

The temperature adjustment unit 21 includes a register 210, a lowest energy update check circuit 220, a highest temperature update check circuit 230, a temperature histogram calculation circuit 240, and a temperature calculation circuit 250.

The register 210 stores the lowest energy reached and the highest value of a set temperature (the highest temperature) in association with each of the search units 10a1 to 10aN.

The lowest energy update check circuit 220 receives an energy value E from each of the search units 10a1 to 10aN at a predetermined data acquisition timing. The lowest energy update check circuit 220 compares the received energy value E for each search unit with the lowest energy for each search unit stored in the register 210 to check for each search unit whether the lowest energy has been updated. The lowest energy update check circuit 220 outputs a signal indicating the check result for each search unit as to whether the lowest energy has been updated, to the highest temperature update check circuit 230 and the temperature histogram calculation circuit 240. When the lowest energy is updated in a certain search unit, the lowest energy update check circuit 220 updates the lowest energy of the corresponding search unit recorded in the register 210 to the energy acquired this time from the corresponding search unit.

When the check result for a certain search unit by the lowest energy update check circuit 220 indicates that the lowest energy has not been updated, the highest temperature update check circuit 230 compares the temperature supplied from the temperature controller 22 with the highest temperature of the corresponding search unit stored in the register 210. The highest temperature update check circuit 230 checks for the corresponding search unit whether the highest temperature has been updated, from the previous update of the lowest energy, according to the comparison. When the highest temperature is updated, the highest temperature update check circuit 230 updates the highest temperature information recorded in the register 210 with the temperature set in the corresponding search unit.

When the check result for the certain search unit by the lowest energy update check circuit 220 indicates that the lowest energy has been updated, the temperature histogram calculation circuit 240 counts on a temperature histogram the highest temperature of the corresponding search unit stored in the register 210. One temperature histogram is generated for all the search units 10a1 to 10aN.

The temperature calculation circuit 250 calculates N new temperatures to be set in the search units 10a1 to 10aN based on the temperature histogram generated by the temperature histogram calculation circuit 240. The temperature calculation circuit 250 uses the equations (6) and (7) to calculate the new temperatures. The lowest temperature tmp_min is preset in the temperature calculation circuit 250. The highest temperature tmp_max is determined by the temperature calculation circuit 250 based on the temperature histogram. A predetermined coefficient α to be used to calculate the new temperatures may be externally input to the temperature calculation circuit 250. The temperature calculation circuit 250 outputs new temperature information indicating the calculated new temperatures and a temperature setting signal (T set sig.) to the temperature controller 22.

Figure 6:
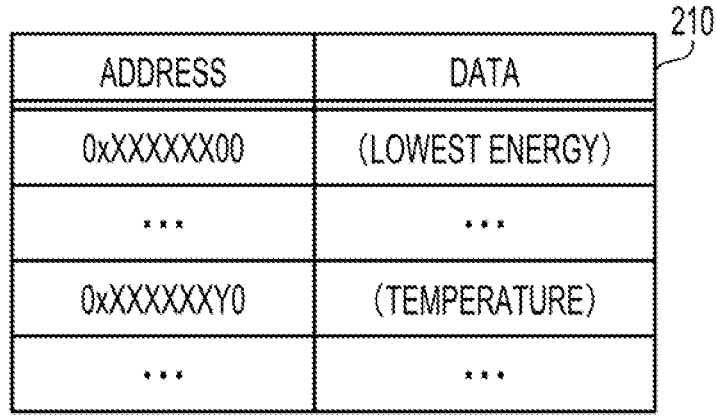
FIG. 6 is a view illustrating an example of data stored in a register.

FIG. 6 is a view illustrating an example of data stored in a register.

Each address of the register 210 is associated with any one search unit and stores data regarding the search unit. For example, an address "0xXXXXXX00" of the register 210 is associated with the search unit 10a1 and stores the lowest energy reached by the search unit 10a1. For example, the lowest energy is represented by 128 bits wide. Thereafter, similarly, for example, for each 128-bit width, the lowest energy regarding each search unit is stored in the register 210, such as the lowest energy of the second search unit 10a2 and the lowest energy of the third search unit.

Further, an address "0xXXXXXXY0" of the register 210 is associated with the search unit 10a1 and stores the highest temperature set in the search unit 10a1 from the previous update of the lowest energy in the search unit 10a1. For example, the temperature is represented by 32 bits wide. Thereafter, similarly, for example, for each 32-bit width, the highest temperature set for each search unit from the time of the previous update of the lowest energy is stored in the register 210, such as the temperature information of the second search unit 10a2 and the temperature information of the third search unit.

In the above configuration example, the temperature adjustment unit 21 is implemented using a dedicated electronic circuit, but the function of the temperature adjustment unit 21 may be implemented by software processing executed by a processor such as a CPU (Central Processing Unit). Therefore, an example of an algorithm for data acquisition by the temperature adjustment unit 21 will be described.

FIG. 7 is a view illustrating an example of a data acquisition algorithm.

A code C1 indicates the definitions of variables.

The sign "min_eg" indicates the energy obtained at the data acquisition timing.

The sign "min_eg_pre" indicates the lowest energy up to the present.

The sign "tmp_idx" indicates a current temperature value (or a temperature index corresponding to the temperature). It is assumed that a larger temperature index indicates a higher temperature.

The sign "tmp_idx_pre" indicates the highest value of the past temperature. The "past" for "tmp_idx_pre" indicates a period from the previous update of the lowest energy up to the present.

The term "histogram" indicates a histogram of temperature (temperature histogram).

The variables "min_eg", "min_eg_pre", "tmp_idx", and "tmp_idx_pre" are provided for each search unit. There is one histogram for the search units 10a1 to 10aN.

A code C2 indicates an algorithm of the temperature adjustment unit 21 which is described using the variables defined in the code C1. The code C2 is executed far each search unit repeatedly or in parallel.

In the first line, it is determined whether min_eg<min_eg_pre. That is, the first line is a determination as to whether the lowest energy has been updated. When min_eg<min_eg_pre, the second to fourth lines are executed in order, and the process is ended. When min_eg≥min_eg_pre, the sixth line is executed.

In the second line, the frequency of tmp_idx_pre is added to the temperature histogram (the frequency of tmp_idx_pre is added by 1).

In the third line, the value of min_eg is set in min_eg_pre. That is, the lowest energy so far is updated.

In the fourth line, the value of tmp_idx is set in tmp_idx_pre. That is, tmp_idx_pre is reset to the temperature index when the lowest energy is updated.

In the sixth line, it is determined whether tmp_idx>tmp_idx_pre. That is, the sixth line is a determination as to whether the past temperature highest value has been updated. When tmp_idx>tmp_idx_pre, the seventh line is executed. When tmp_idx≤tm_idx_pre, the process is ended.

In the seventh line, the value of tmp_idx is set in tmp_idx_pre. That is, tmp_idx_pre is updated to the current temperature set for the corresponding search unit.

Figure 8:
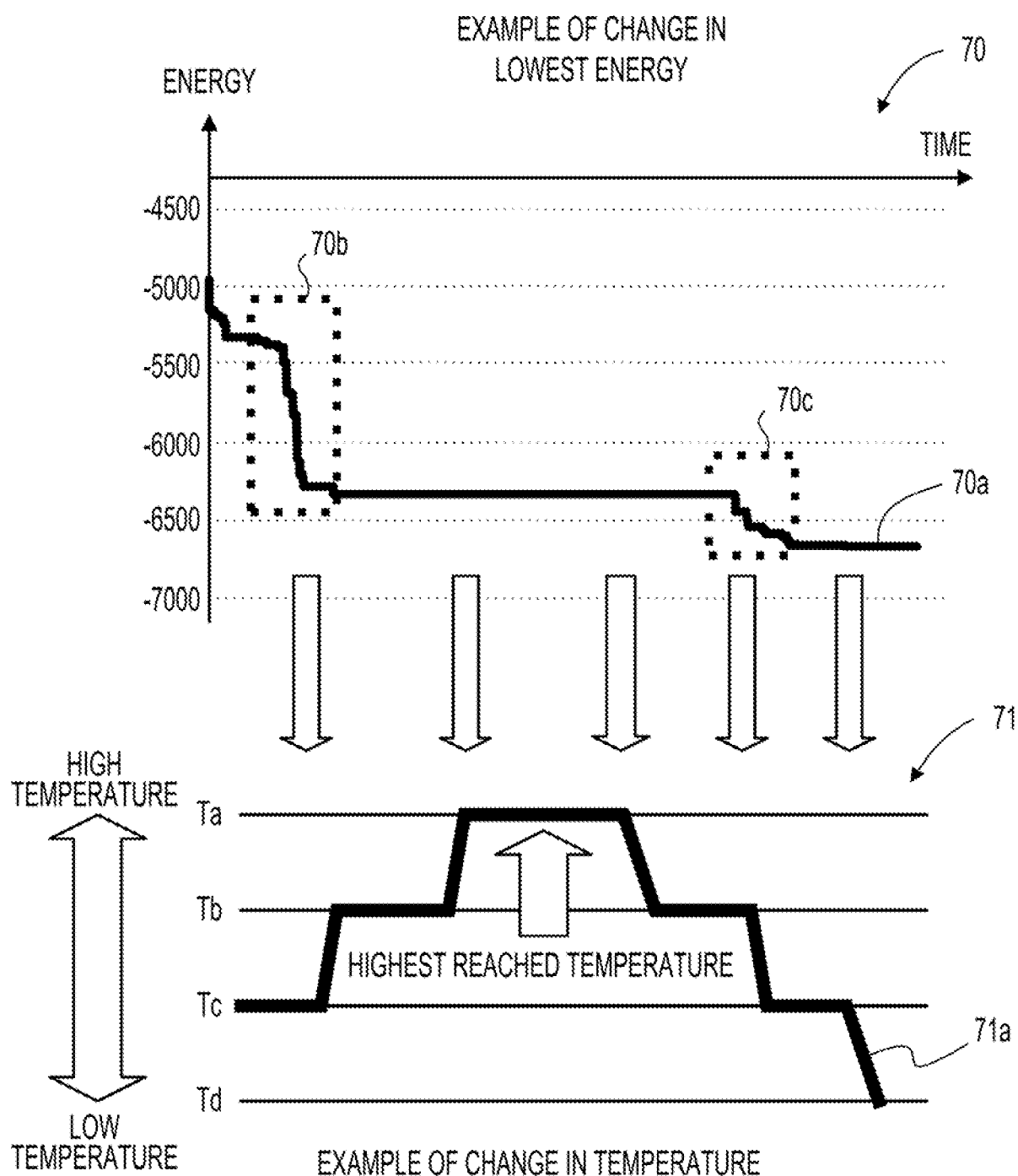
FIG. 8 is a view illustrating an example of change in the lowest energy and temperature.

FIG. 8 is a view illustrating an example of change in lowest energy and temperature.

A graph 70 illustrates an example of change in lowest energy in a certain search unit. A graph 71 illustrates an example of change in temperature in the search unit.

In the graphs 70 and 71, the horizontal axis represents time in which the direction from the left side to the right side is the positive direction of time. The same position on the horizontal axis of the graphs 70 and 71 indicates the same time. The vertical axis of the graph 70 represents energy. The vertical axis of the graph 71 represents temperature. Temperatures Ta, Tb, Tc, and Td are represented on the vertical axis of the graph 71. Here, Ta>Tb>Tc>Td.

The graph 70 includes a series 70a. According to the series 70a, the lowest energy is updated in two periods 70b and 70c. The graph 71 includes a series 71a.

According to the series 71a, the highest temperature which is reached by the corresponding search unit between the point of time when the lowest energy is updated in the period 70b and the point of time when the lowest energy is updated in the period 70c is Ta.

The examples of the graphs 70 and 71 represent that it is necessary to once increase the temperature to the highest temperature Ta in order to update the lowest energy in the corresponding search unit. Therefore, the temperature adjustment unit 21 acquires the highest temperature reached to update the lowest energy in this way as statistical information, and determines a temperature to be set for each search unit based on the statistical information.

Figure 9:
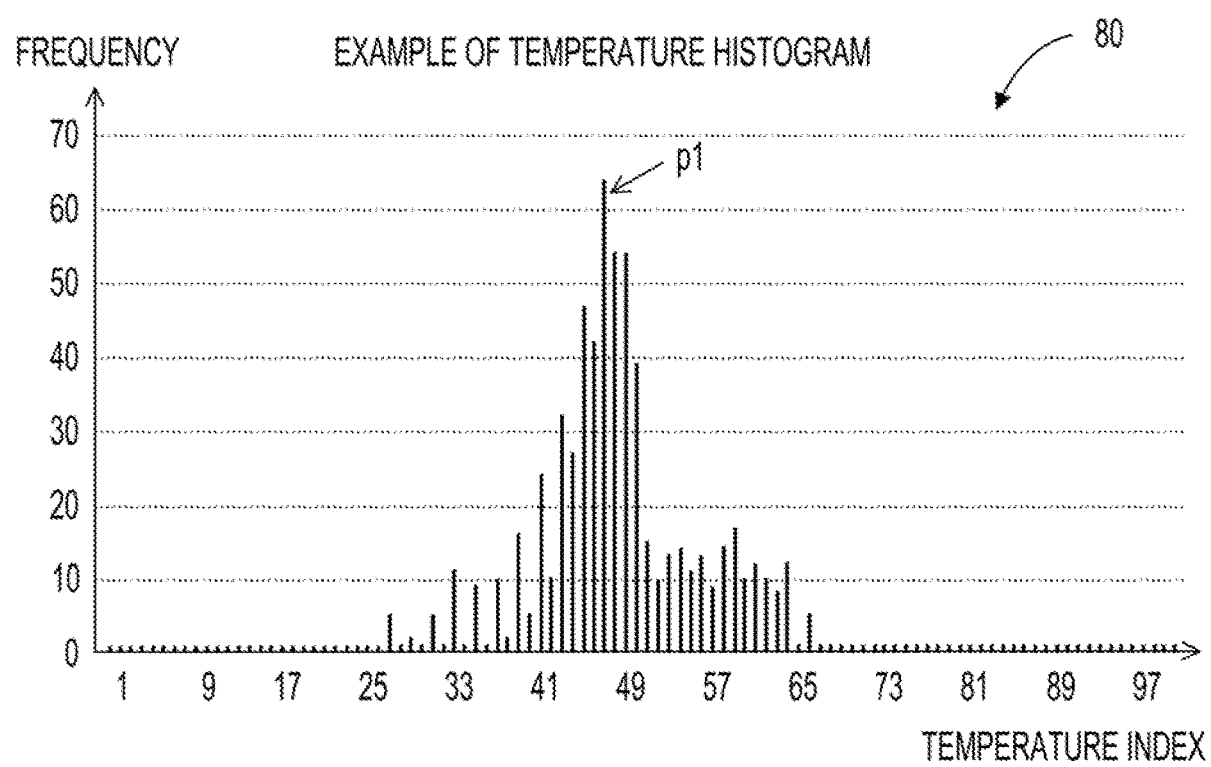
FIG. 9 is a view illustrating an example of a temperature histogram.

FIG. 9 is a view illustrating an example of a temperature histogram.

The temperature histogram 80 is generated by the temperature histogram calculation circuit 240. Further, when temperature adjustment is performed using a processor such as a CPU, the temperature histogram 80 corresponds to "histogram" in FIG. 7.

The horizontal axis of the temperature histogram 80 represents a temperature index, and the vertical axis thereof represents the frequency.

For example, the temperature calculation circuit 250 determines a temperature corresponding to a temperature index with the highest frequency in the temperature histogram 80 as the highest temperature tmp_max. Specifically, the temperature calculation circuit 250 determines the highest temperature tmp_max from the temperatures with high frequency in the temperature histogram 80. In an example, the temperature calculation circuit 250 determines the temperature with the highest frequency indicated by a peak p1 as the highest temperature tmp_max. When the temperature histogram 80 is created for the temperature index, the temperature calculation circuit 250 specifies a temperature value corresponding to the temperature index by referring to, for example, the above-mentioned first association information. In this case, for example, it is conceivable that the temperature calculation circuit 250 may refer to the above-mentioned first association information held by the temperature controller 22. The temperature calculation circuit 250 uses the determined highest temperature tmp_max to calculate a new temperature tmp[i] (1≤i≤N) according to the equations (6) and (7).

However, according to a problem, the peak p1 as described above may not appear or a plurality of peaks may appear. In such a case, for example, the temperature calculation circuit 250 uses a cumulative histogram based on the temperature histogram 80 to determine the highest temperature tmp_max as follows.

Figure 10:
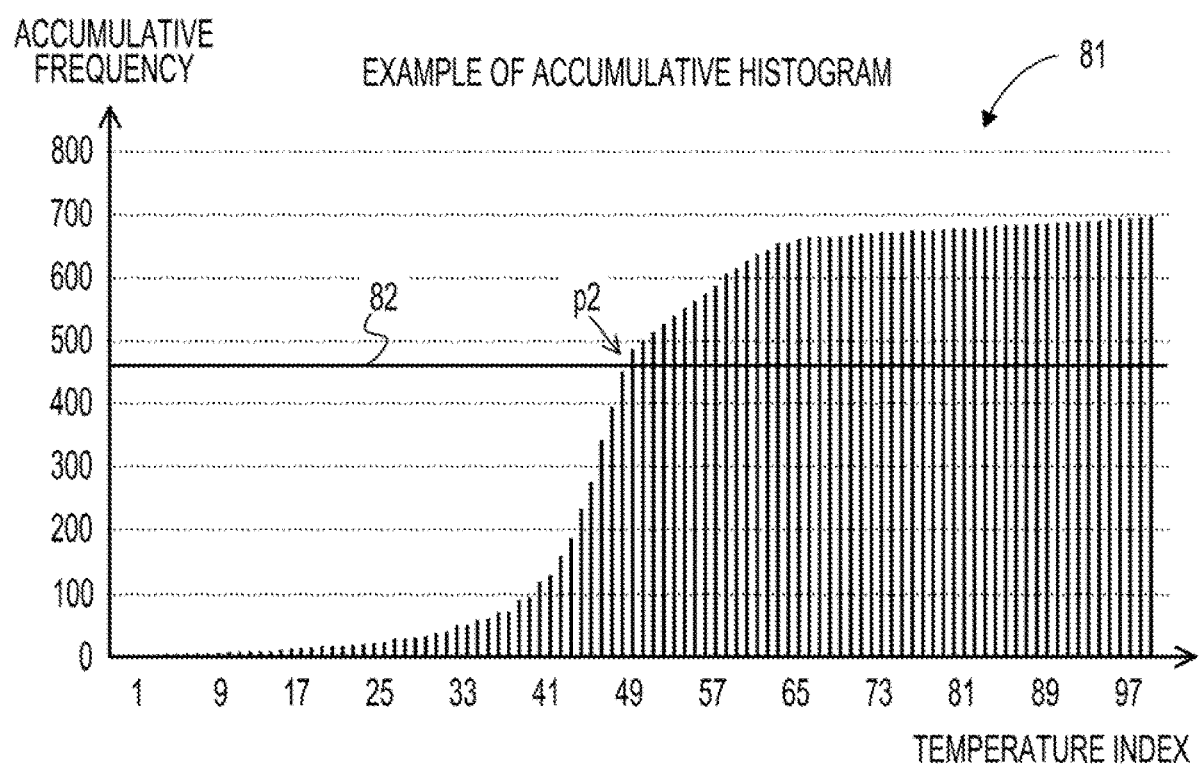
FIG. 10 is a view illustrating an example of a cumulative histogram.

FIG. 10 is a view illustrating an example of a cumulative histogram.

An accumulative histogram 81 is a histogram obtained by accumulating the frequency illustrated in the temperature histogram 80 from the lower temperature. The cumulative histogram 81 is generated by the temperature calculation circuit 250. The horizontal axis of the cumulative histogram 81 represents a temperature index, and the vertical axis thereof represents the cumulative frequency.

The temperature calculation circuit 250 determines the highest temperature tmp_max based on the cumulative histogram ratio (cumulative ratio). For example, the cumulative ratio is set to 70% (coefficient α=0.7) as an example. In the cumulative histogram 81, the cumulative ratio of 70% is indicated by a straight line 82. In this case, the temperature calculation circuit 250 specifies a temperature corresponding to the cumulative frequency obtained by multiplying the maximum value of the cumulative frequency in the cumulative histogram 81 by the coefficient α indicating the cumulative ratio (temperature corresponding to the cumulative frequency at a point p2), and determines the temperature as the highest temperature tmp_max. In this example, the maximum value of the cumulative frequency is the cumulative frequency corresponding to the maximum value of the temperature index. The maximum value of the cumulative frequency corresponds to the total number of times of update of the lowest energy of each search unit.

The temperature calculation circuit 250 uses the determined highest temperature tmp_max to calculate a new temperature tmp[i] (1≤i≤N) according to the equations (6) and (7). Further, the coefficient α used as the cumulative ratio may be externally input as described above.

As described above, when the peak p1 is not detected in the temperature histogram 80 or when a plurality of peaks is detected, the temperature calculation circuit 250 may use the cumulative histogram 81 to determine the highest temperature tmp_max. Alternatively, whether to use the temperature histogram 80 or the cumulative histogram 81 may be preset in the temperature calculation circuit 250.

Next, the processing procedure by the optimization device 1 will be described.

Figure 11:
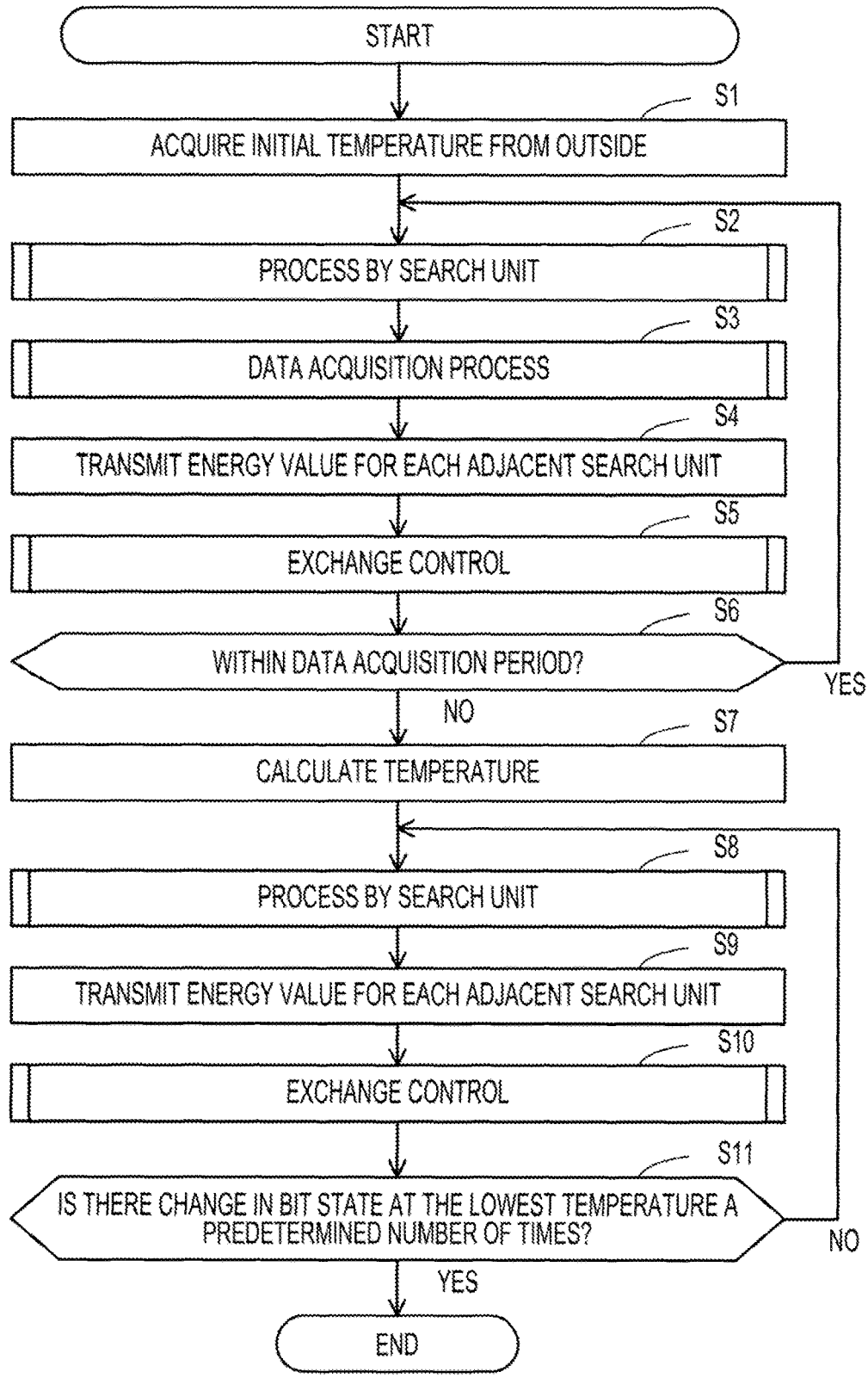
FIG. 11 is a flowchart illustrating an example of entire control of replica exchange.

FIG. 11 is a flowchart illustrating an example of entire control of replica exchange.

(S1) The entire controller 24 receives temperature information indicating an initial temperature as input data from the outside, and outputs an activation signal to the temperature controller 22, together with the temperature information.

(S2) Upon receiving the activation signal from the entire controller 24, the temperature controller 22 sets a temperature by outputting the temperature information and a temperature setting signal to each of the search units 10a1 to 10aN, and causes each of the search units 10a1 to 10aN to execute a stochastic search process. The search process by each of the search units 10a1 to 10aN will be described in detail later.

(S3) When the stochastic search for a prescribed time or the prescribed number of iterations is performed in each of the search units 10a1 to 10aN, the temperature adjustment unit 21 performs a data collection process including acquisition of an energy value calculated in each of the search units 10a1 to 10aN. The data collection process will be described in detail later.

(S4) The search units 10a1 to 10aN transmit the energy value of each adjacent search unit to the temperature controller 22. The temperature controller 22 acquires the energy value calculated by the search units 10a1 to 10aN for each search unit having an adjacent temperature.

(S5) The exchange controller 23 performs a temperature exchange control according to the exchange probability based on the equation (5) using an energy difference between search units adjacent to each other in terms of temperature. The exchange controller 23 performs the temperature exchange control for each pair of search units having an adjacent temperature. The temperature exchange control will be described in detail later.

(S6) The temperature adjustment unit 21 determines whether the temperature exchange control is within a data acquisition period for temperature adjustment. When it is determined that the temperature exchange control is within the data acquisition period for temperature adjustment, the process proceeds to step S2. When it is determined that the temperature exchange control is not within the data acquisition period for temperature adjustment, the process proceeds to step S7.

(S7) Based on the temperature histogram 80 (or the cumulative histogram 81) created as a result of the data collection process in step S3, the temperature adjustment unit 21 calculates the highest temperature tmp_max used in the equations (6) and (7). The temperature adjustment unit 21 uses the calculated highest temperature tmp_max to calculate a new temperature tmp[i] based on the equations (6) and (7). The temperature adjustment unit 21 outputs new temperature information indicating the calculated new temperature and a temperature setting signal to the temperature controller 22. Upon receiving the new temperature information and the temperature setting signal output from the temperature adjustment unit 21, the temperature controller 22 updates a temperature associated with each temperature index in the first association information held by the temperature controller 22.

(S8) The temperature controller 22 sets a temperature by outputting the new temperature information and the temperature setting signal to each of the search units 10a1 to 10aN, and causes each of the search units 10a1 to 10aN to execute a stochastic search (ground state search).

(S9) When the stochastic search for a prescribed time or the prescribed number of iterations is performed in the search units 10a1 to 10aN, the search units 10a1 to 10aN transmit the energy value of each adjacent search unit to the exchange controller 23. The exchange controller 23 acquires the energy value calculated by the search units 10a1 to 10aN for each search unit having an adjacent temperature.

(S10) The exchange controller 23 performs a temperature exchange control according to the exchange probability based on the equation (5) using an energy difference between search units adjacent to each other in terms of temperature. The exchange controller 23 performs the temperature exchange control for each pair of search units having an adjacent temperature.

(S11) The search units 10a1 to 10aN determine whether there is a change in bit state in the search unit at the lowest temperature a predetermined number of times. When it is determined that there is no change in bit state in the search unit at the lowest temperature, the search units 10a1 to 10aN output the bit state to the entire controller 24 and end the entire control process of replica exchange. When it is determined that there is a change in bit state in the search unit at the lowest temperature, the search units 10a1 to 10aN proceed to step S8 where the stochastic search process continues.

Figure 12:
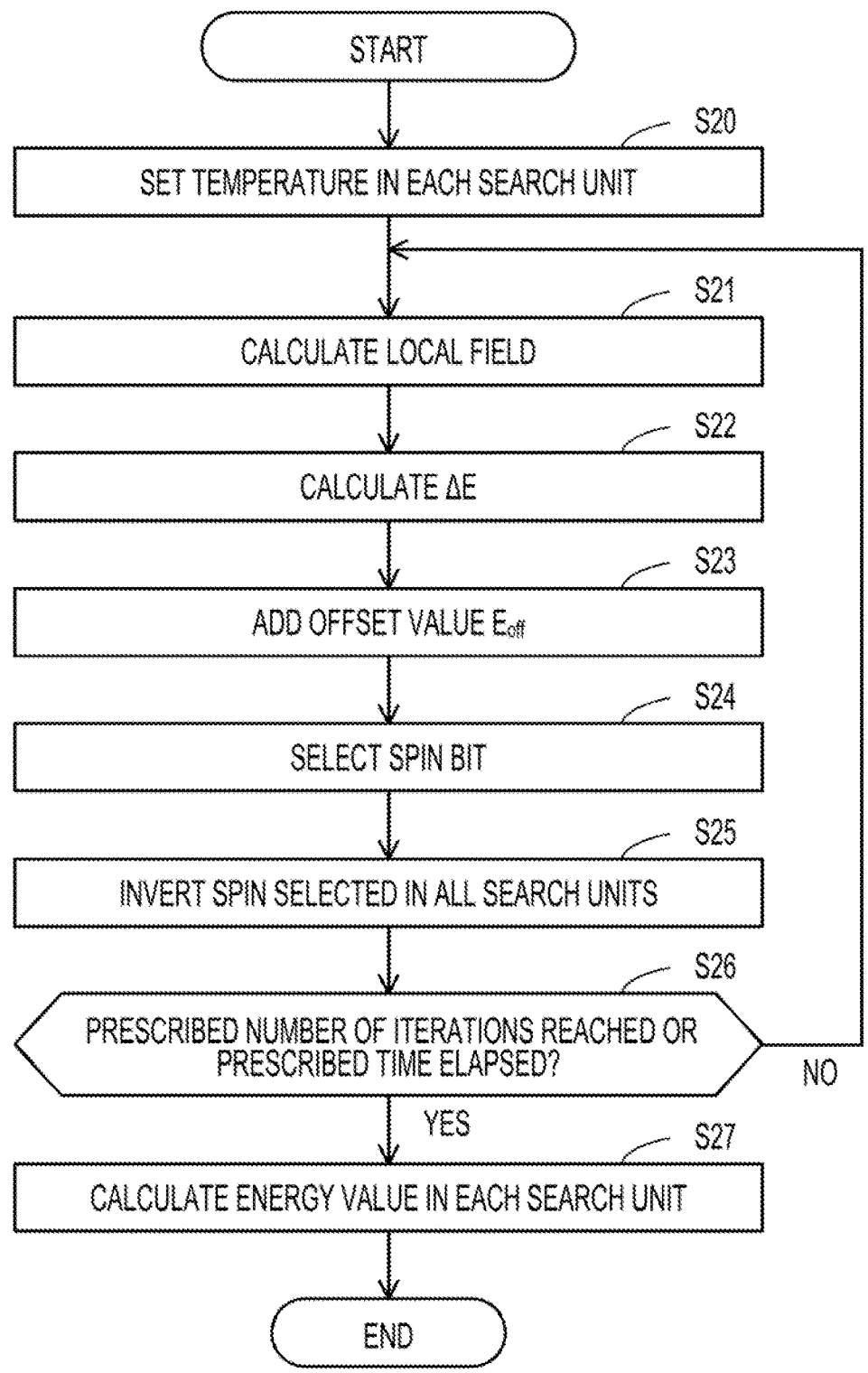
FIG. 12 is a flowchart illustrating an example of a search unit process.

FIG. 12 is a flowchart illustrating an example of a search unit process.

The search unit process corresponds to steps S2 and S8.

(S20) The temperature controller 22 sets a temperature in each of the search units 10a1 to 10aN. For example, the temperature controller 22 sets a temperature in each of the search units 10a1 to 10aN based on the first association information that associates the temperature index with the temperature, and the second association information that associates the temperature index with the search unit identification information. Alternatively, as described above, the temperature controller 22 may set a temperature in each of the search units 10a1 to 10aN based on the association information that associates the search unit identification information with the temperature. The initial value of the temperature set in each of the search units 10a1 to 10aN is determined in advance according to a problem or the like.

(S21) Each of the search units 10a1 to 10aN calculates a local field h for each spin bit. For example, focusing on the search unit 10a1, the h calculation units 12b1 to 12bn calculate the local fields $h_1$ to $h_n$. The local field h is calculated based on the equation (10). In addition, after the local field h is calculated according to the equation (10), an updated local field h=h+δh may be obtained by adding, for example, the difference δh expressed by the equation (11) to the local field h.

(S22) Each of the search units 10a1 to 10aN calculates an energy change value ΔE for each spin bit based on the calculated local field h. For example, focusing on the search unit 10a1, the ΔE generation units 12c1 to 12cn calculate energy change values $\Delta E_1$ to $\Delta E_n$. ΔE is calculated based on the equation (9).

(S23) Each of the search units 10a1 to 10aN adds the offset value $E_{off}$ to the energy change value −ΔE. For example, focusing on the search unit 10a1, the adders 13a1 to 13an add the offset value $E_{off}$ to $-\Delta E_1$ to $-\Delta E_n$. The offset value $E_{off}$ is controlled by the offset controller 13d as described above. For example, the offset controller 13d supplies the offset value $E_{off}$ greater than 0 to the adders 13a1 to 13an when a flag indicating whether transition is possible, which is output from the selector unit 13c, indicates that the transition is not possible. The offset controller 13d supplies the offset value $E_{off}$=0 to the adders 13a1 to 13an when the flag indicates that the transition is possible. The initial value of the offset value $E_{off}$ is zero.

(S24) Each of the search units 10a1 to 10aN selects a spin bit to be inverted from among inversion candidate spin bits. For example, focusing on the search unit 10a1, each of the state transition determination circuits 13b1 to 13bn outputs, to the selector unit 13c, a flag indicating whether transition of a spin bit corresponding to the corresponding state transition determination circuit is possible. The selector unit 13c selects one of the input flags, and outputs the selected flag and an index indicating a spin bit corresponding to the selected flag.

(S25) Each of the search units 10a1 to 10aN inverts the selected spin (spin bit). For example, focusing on the search unit 10a1, the state holding unit 11 updates the value of a spin bit indicated by the index among spin bits included in a bit state based on the flag and the index output from the selector unit 13c.

(S25) Each of the search units 10a1 to 10aN determines whether the prescribed number of iterations has been reached or a prescribed time has elapsed from the start of the stochastic search immediately after step S20. When it is determined that the prescribed number of iterations has been reached or the prescribed time has elapsed, the process proceeds to step S27. When it is determined that the prescribed number of iterations has not been reached and the prescribed time has not elapsed, the process proceeds to step S21.

(S27) Each of the search units 10a1 to 10aN calculates energy values ($E_1$ to $E_N$) in the corresponding search unit and outputs the energy values to the temperature adjustment unit 21 and the temperature controller 22.

As described above, based on a temperature value, an energy change value, and a random value, each of the search units 10a1 to 10aN determines stochastically whether to accept one of a plurality of state transitions according to a relative relationship between the energy change value and the thermal excitation energy. In the determination, the transition controller (e.g., the transition controller 13) of each of the search units 10a1 to 10aN adds a predetermined offset value to the change value of the energy value. As a result, escape from the local solution is promoted and the calculation speed may be increased.

Figure 13:
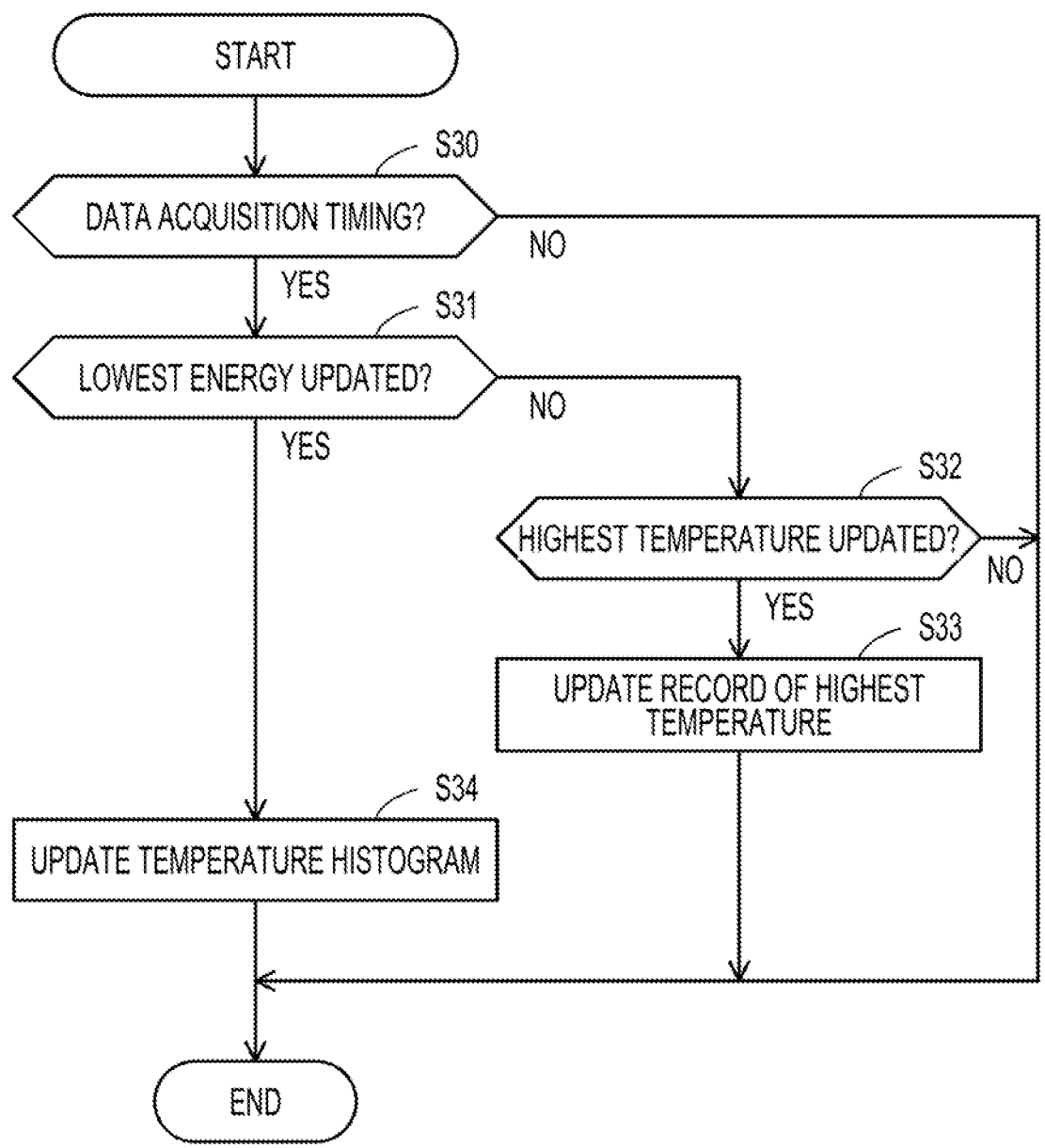
FIG. 13 is a flowchart illustrating an example of a data collection process.

FIG. 13 is a flowchart illustrating an example of a data collection process.

The data collection process corresponds to step S3. Hereinafter, a procedure for the search unit 10a1 by the temperature adjustment unit 21 will be described, but the same procedure is applied to the search units 10a2 to 10aN. The following steps S31 to S34 are executed for each of the search units 10a1 to 10aN. One temperature histogram 80 in step S34 is calculated for the search units 10a1 to 10aN.

(S30) The lowest energy update check circuit 220 determines whether the timing is a data collection timing. When it is determined that the timing is a data collection timing, the process proceeds to step S31. When it is determined that the timing is not a data collection timing, the data collection process is ended. Here, the data collection timing may be a timing for each completion of the search process (the procedure of FIG. 12) of the search units 10a1 to 10aN, or may be a timing for each of plural times of completion of the search process. The timing of data collection is preset for the temperature adjustment unit 21.

(S31) The lowest energy update check circuit 220 acquires energy $E_1$ from the search unit 10a1. The lowest energy update check circuit 220 compares the lowest energy of the search unit 10a1 stored in the register 210 with the acquired energy $E_1$ to determine whether the lowest energy has been updated. The case where the lowest energy of the search unit 10a1 has been updated refers to a case where the energy E acquired from the search unit 10a1 is lower than the lowest energy of the search unit 10a1 stored in the register 210. When the lowest energy has been updated, the lowest energy update check circuit 220 updates the record of the lowest energy of the search unit 10a1 stored in the register 210 to the energy $E_1$ acquired this time from the search unit 10a1, and the process proceeds to step S34. When the lowest energy has not been updated, the process proceeds to step S32.

(S32) The highest temperature update check circuit 230 acquires the temperature set in the search unit 10a1 from the temperature controller 22, and determines whether the highest temperature for the search unit 10a1 stored in the register 210 has been updated. The case where the highest temperature for the search unit 10a1 has been updated refers to a case where the temperature set in the search unit 10a1 is higher than the highest temperature for the search unit 10a1 stored in the register 210. When the highest temperature has been updated, the process proceeds to step S33. When the highest temperature has not been updated, the data collection process for the search unit 10a1 is ended.

(S33) The highest temperature update check circuit 230 updates the record of the highest temperature of the search unit 10a1 stored in the register 210 to the temperature which is acquired from the temperature controller 22 and currently set in the search unit 10a1. Then, the data collection process for the search part 10a1 is ended.

(S34) The temperature histogram calculation circuit 240 reads the highest temperature corresponding to the search unit 10a1 from the register 210, and adds 1 to the frequency of the highest temperature in the temperature histogram 80. As described above, one temperature histogram 80 is generated for the search units 10a1 to 10aN. In addition, the highest temperature update check circuit 230 updates the record of the highest temperature of the search unit 10a1 stored in the register 210 to the temperature acquired from the temperature controller 22 and currently set in the search unit 10a1. Then, the data collection process for the search unit 10a1 is ended.

The temperature adjustment unit 21 may execute the processes of steps S31 to S34 in parallel for each of the search units 10a1 to 10aN. Alternatively, the temperature adjustment unit 21 may select any one of the search units 10a1 to 10aN in order and repeatedly execute the processes of steps S31 to S34.

Figure 14:
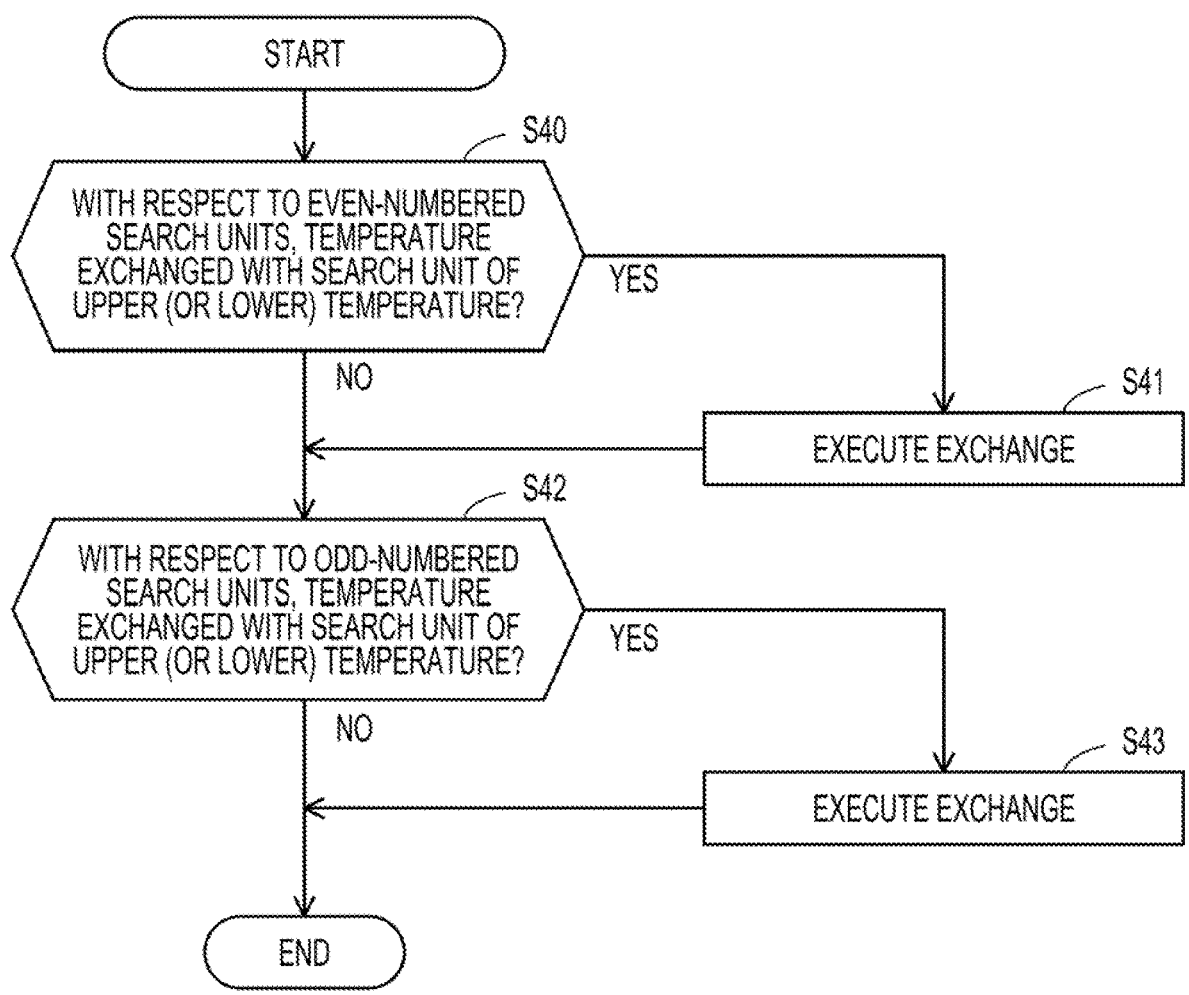
FIG. 14 is a flowchart illustrating an example of an exchange control.

FIG. 14 is a flowchart illustrating an example of an exchange control.

The exchange control corresponds to steps S5 and S10.

(S40) With respect to the even-numbered search units, the exchange controller 23 determines whether to exchange the temperature with the search unit of the adjacent upper (or lower) temperature based on the exchange probability expressed by the equation (5). The temperature exchange determination is performed for each pair of search units. As the function f of the equation (5), the function of the Metropolis method of the equation (2) or the function of the Gibbs method of the equation (3) is used. When there is a pair of search units determined to exchange the temperature, the process proceeds to step S41. When there is no search unit pair determined to exchange the temperature, the process proceeds to step S42.

(S41) The exchange controller 23 exchanges the temperature for the pair of search units determined to exchange the temperature in step S40. The exchange controller 23 updates the above-mentioned second association information held by the exchange controller 23 according to the exchange of the temperature.

(S42) With respect to the odd-numbered search units, the exchange controller 23 determines whether to exchange the temperature with the search unit of the adjacent upper (or lower) temperature based on the exchange probability expressed by the equation (5). The temperature exchange determination is performed for each pair of search units. As the function f of the equation (5), the function of the Metropolis method of the equation (2) or the function of the Gibbs method of the equation (3) is used. When the exchange controller 23 determines in step S40 whether to exchange the temperature with the search unit of the upper temperature for the even-numbered search units, the exchange controller 23 determines in step S42 whether to exchange the temperature with the search unit of the upper temperature for the odd-numbered search units. When the exchange controller 23 determines in step S40 whether to exchange the temperature with the search unit of the lower temperature for the even-numbered search units, the exchange controller 23 determines in step S42 whether to exchange the temperature with the search unit of the lower temperature for the odd-numbered search units. When there is a pair of search units determined to exchange the temperature, the process proceeds to step S43. When there is no search unit pair determined to exchange the temperature, the exchange control is ended.

(S43) The exchange controller 23 exchanges the temperature for the pair of search units determined to exchange the temperature in step S42. The exchange controller 23 updates the second association information held by the exchange controller 23 according to the temperature exchange. Then, the exchange control is ended.

In the above example, focusing on the odd-numbered search units next to the even-numbered search units, the temperature exchange control is performed. However, focusing on the even-numbered search units next to the odd-numbered search units, the temperature exchange control may be performed. That is, steps S40 and S41 may be executed after steps S42 and S43.

Next, an example of the flow of processing by the optimization device 1 will be described. Hereinafter, a case where a temperature adjustment is performed by software processing by a CPU and a case where a temperature adjustment is performed by hardware processing illustrated in the temperature adjustment unit 21 will be exemplified.

First, the case where the temperature adjustment is performed by software processing by the CPU is exemplified. In this case, for example, the function of the temperature adjustment unit 21 is implemented in the optimization device 1 as the function of software executed by the CPU. Further, the function of the temperature controller 22 (including the exchange controller 23) is implemented in the optimization device 1 not only as the hardware function but also as the software function executed by the CPU. Then, steps S3 to S7 in FIG. 11 are executed as software processing executed by the CPU, and steps S2 and S8 to S11 in FIG. 11 are executed as hardware processing.

Figure 15:
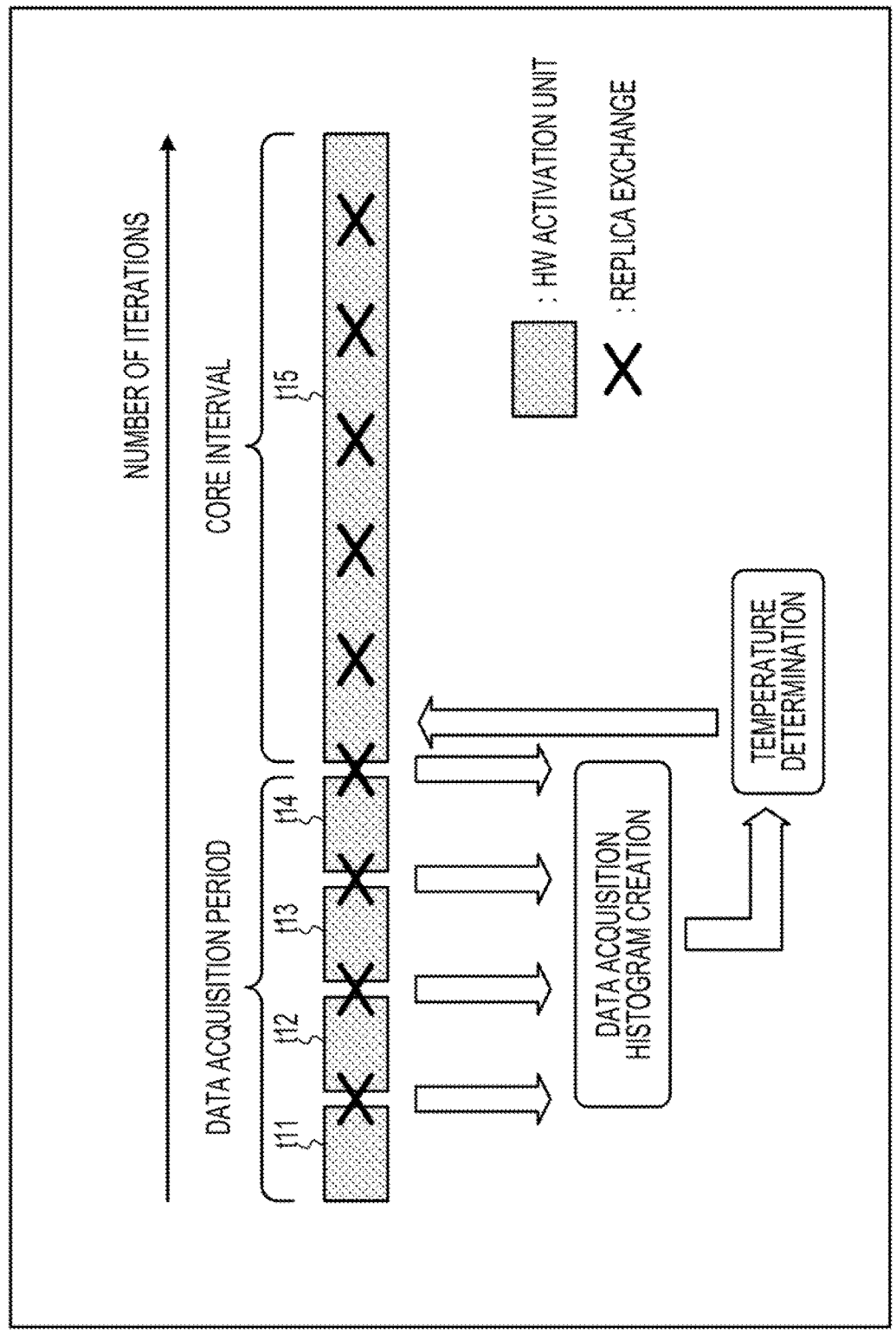
FIG. 15 is a view illustrating an example of flow of processing (part 1)

FIG. 15 is a view illustrating an example (part 1) of the flow of processing.

In FIG. 15, the horizontal axis represents the number of iterations (or time) in which the direction from the left to the right is the positive direction.

A data acquisition period by a CPU includes periods t11, t12, t13, and t14 of HW (Hardware) activation units. A period of HW activation unit refers to a unit period in which the search units 10a1 to 10aN are activated to execute a search process (ground state search). A period (core interval) in which the stochastic search after temperature adjustment is performed includes a period t15 of HW activation unit. In the figure, "X" indicates a timing in which replica exchange (i.e., temperature exchange) is performed. Data acquisition by the CPU is performed immediately before replica exchange in the data acquisition period.

For example, immediately after completion of the period t11, the CPU acquires the energy (and the temperature when the lowest energy is not updated) in the search units 10a1 to 10aN. The CPU creates the temperature histogram 80 according to the update of the lowest energy. Thereafter, replica exchange (temperature exchange control) is performed by the CPU. Then, the stochastic search is performed by the search units 10a1 to 10aN in the next period t12. Thus, in the data acquisition period, immediately after each of the periods t11, t12, t13, and t14, the CPU acquires data regarding the search units 10a1 to 10aN and creates the temperature histogram 80. When the data acquisition period is completed, the CPU determines a new temperature tmp[i] based on the temperature histogram 80. Further, the length of the data acquisition period is set in advance for software executed by the CPU (e.g., when the total number of iterations for stochastic search is determined, such a number is about 1% of the total number of iterations).

Then, the period t15 of the core interval is started using the new temperature tmp[i]. In the core interval, the CPU does not intervene in the processing, and the stochastic search and replica exchange are executed by the search units 10a1 to 10aN and the temperature controller 22 (including the exchange controller 23) implemented by hardware. For this reason, the period of the core interval corresponds to the period t15 of HW activation unit.

In the above example, the stochastic search is executed without changing the adjusted temperature after the first data acquisition period of the entire period of the stochastic search by the search units 10a1 to 10aN. In the meantime, a data acquisition period may be provided periodically, and the CPU may repeatedly execute a data acquisition and a temperature determination based on the acquired data, and change the temperature set in the search units 10a1 to 10aN each time.

Next, the flow of processing when temperature adjustment is performed by hardware processing will be described.

Figure 16:
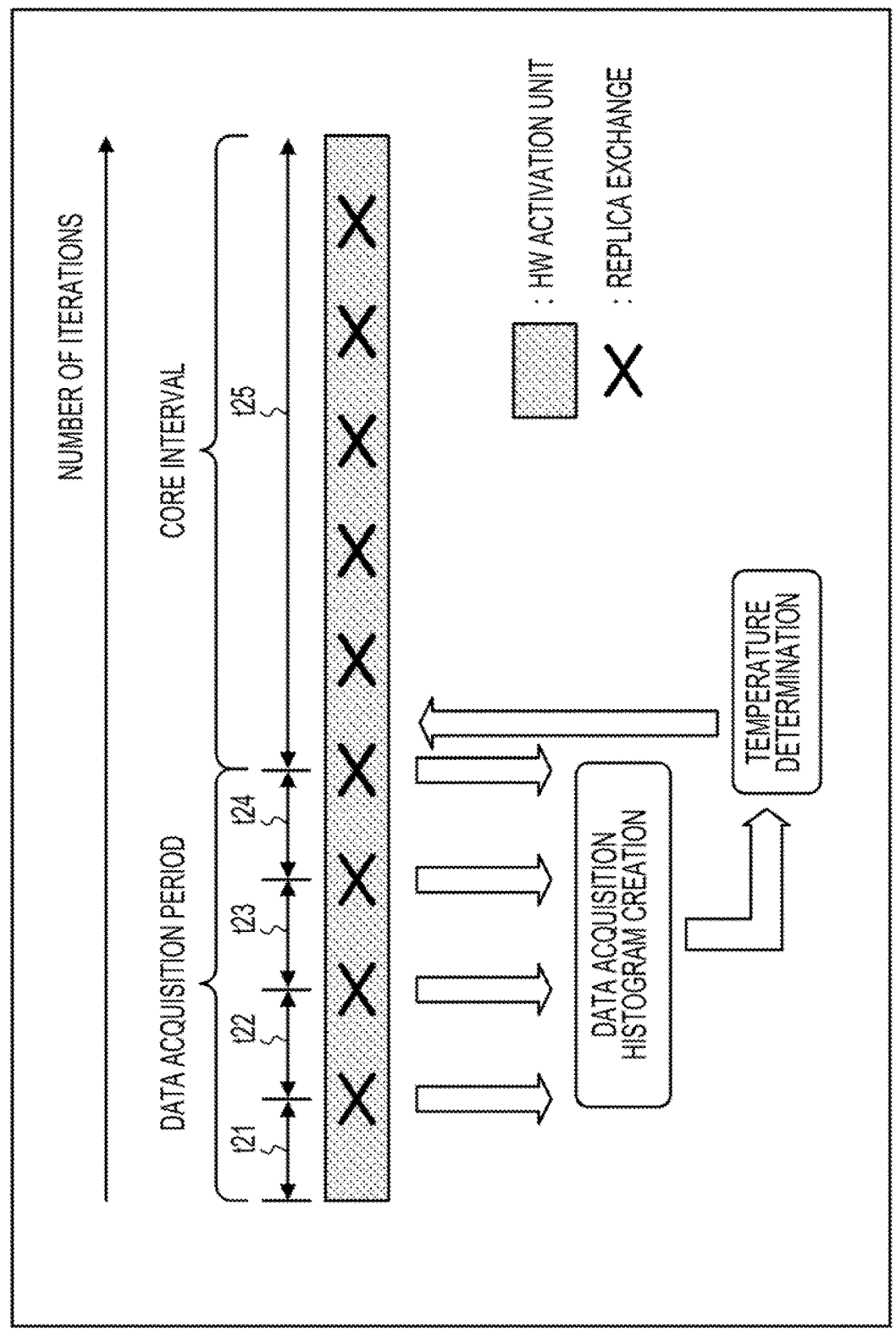
FIG. 16 is a view illustrating an example of flow of processing (part 2)

FIG. 16 is a view illustrating an example (part 2) of the flow of processing.

In FIG. 16, the horizontal axis represents the number of iterations (or time) in which the direction from the left to the right is the positive direction.

When a temperature adjustment is performed by hardware processing, the entire period including a data acquisition period and a core interval is a period of HW activation unit.

A data acquisition period by the temperature adjustment unit 21 includes unit periods t21, t22, t23, and t24. A period t25 is a core interval. In the figure, "X" indicates a timing in which replica exchange (i.e., temperature exchange) is performed. Data acquisition by the temperature adjustment unit 21 is performed immediately before replica exchange in the data acquisition period.

For example, immediately after completion of the period t21, the temperature adjustment unit 21 acquires the energy (and the temperature when the lowest energy is not updated) in the search units 10a1 to 10aN. The temperature adjustment unit 21 creates the temperature histogram 80 according to the update of the lowest energy. Thereafter, a replica exchange (temperature exchange control) is performed by the temperature adjustment unit 21. Then, the stochastic search is performed by the search units 10a1 to 10aN in the next period t22. Thus, in the data acquisition period, immediately after each of the periods t21, t22, t23, and t24, the temperature adjustment unit 21 acquires data regarding the search units 10a1 to 10aN and creates the temperature histogram 80. When the data acquisition period is completed, the temperature adjustment unit 21 determines a new temperature tmp[i] based on the temperature histogram 80.

In addition, the length of the data acquisition period is set in advance for the temperature adjustment unit 21 (e.g., when the total number of iterations for stochastic search is determined, such a number is about 1% of the total number of iterations). Then, the period t25 of the core interval is started using the new temperature tmp[i].

In the above example, the stochastic search is executed without changing the adjusted temperature after the first data acquisition period of the entire period of the stochastic search by the search units 10a1 to 10aN. In the meantime, a data acquisition period may be provided periodically, and the temperature adjustment unit 21 may repeatedly execute a data acquisition and a temperature determination based on the acquired data, and change the temperature set in the search units 10a1 to 10aN each time.

The optimization device 1 may appropriately determine the temperatures set in the search units 10a1 to 10aN. Specifically, by determining the maximum value of the new temperature tmp[i] based on the update of the lowest energy in the data acquisition period and the statistical information of the set highest temperature, it is possible to prevent the temperature set in each search unit from being too high or too low. Therefore, the solution precision in the optimization device 1 may be improved. In addition, the improvement in solution accuracy increases the possibility of reaching an appropriate solution earlier, thereby increasing the calculation speed.

Further, in order to determine an appropriate highest temperature (a temperature corresponding to tmp_max), it is conceivable that the optimization process by the optimization device 1 is repeatedly executed and a user manually adjusts such a process. However, this takes a lot of labor. In the meantime, as described above, by determining the highest temperature tmp_max based on the temperature statistical information, it is possible to reduce the labor of temperature adjustment by the user work.

In addition, when the temperature adjustment is performed by hardware processing, the overhead associated with data output to the CPU and data input from the CPU may be reduced compared to the case where the temperature adjustment is performed by software processing.

Here, as a hardware configuration of the optimization device 1, the following example is also conceivable.

Figure 17:
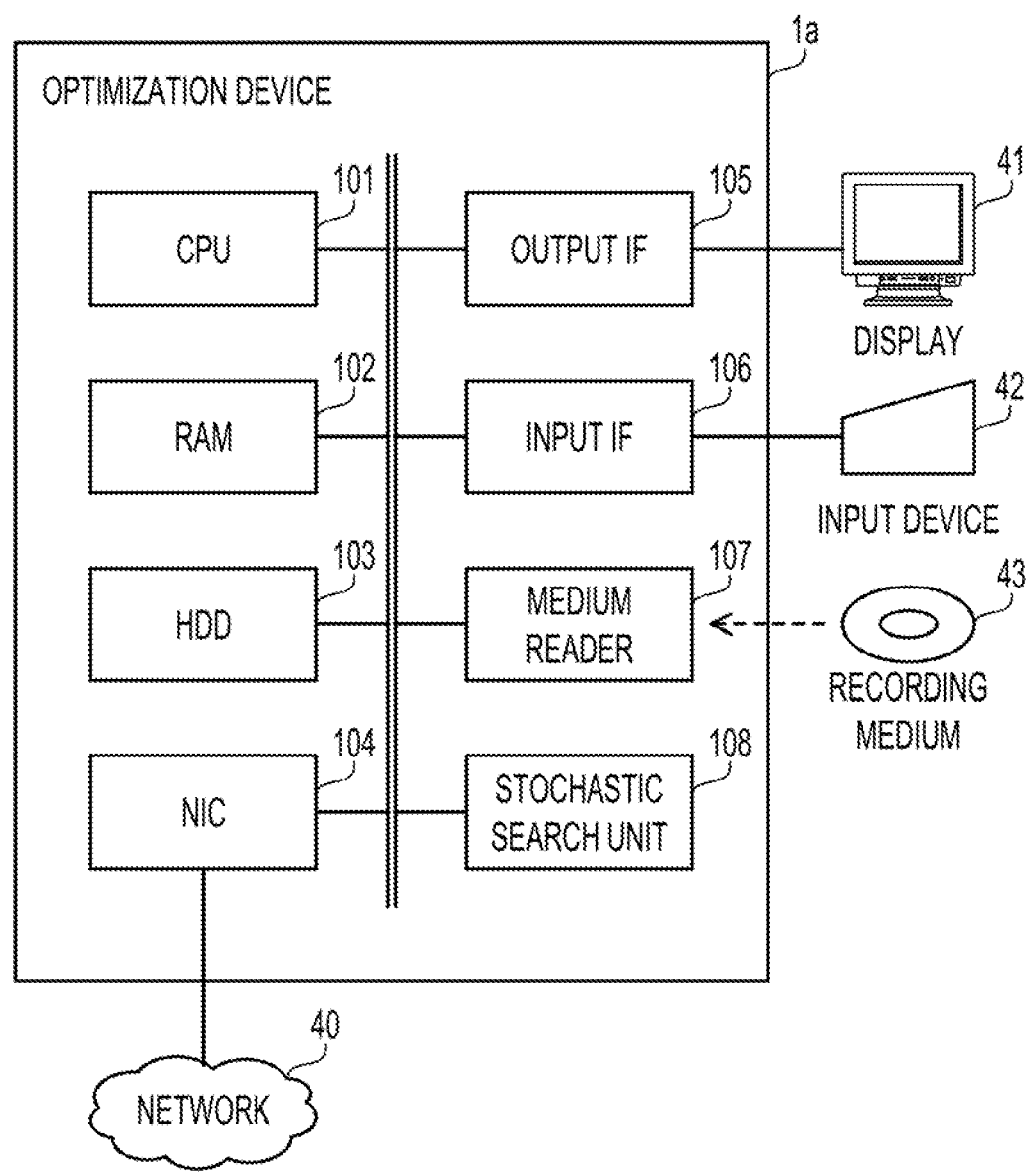
FIG. 17 is a view illustrating another hardware example of the optimization device.

FIG. 17 is a view illustrating another hardware example of the optimization device.

The optimization device 1a is an information processing apparatus including a CPU 101, a RAM (Random Access Memory) 102, an HDD (Hard Disk Drive) 103, a NIC (Network Interface Card) 104, an output IF (Interface) 105, an input IF 106, a medium reader 107, and a stochastic search unit 108.

The CPU 101 is a processor that executes program instructions. The CPU 101 loads at least some of programs and data stored in the HDD 103 into the RAM 102 and executes the programs. The CPU 101 may include a plurality of processor cores. The optimization device 1a may have a plurality of processors. A set of processors may be referred to as a "multiprocessor" or simply a "processor". For example, the CPU 101 may function as the entire controller 24. Further, as described above, the function of the controller 20 (i.e., the temperature adjustment unit 21, the temperature controller 22, and the exchange controller 23) may also be implemented by software (control program) processing executed by the CPU 101.

The RAM 102 is a volatile semiconductor memory that temporarily stores programs executed by the CPU 101 and data used by the CPU 101 for calculations. The optimization device 1a may include a memory of a type other than the RAM, or may include a plurality of memories.

The HDD 103 is a nonvolatile storage device that stores software programs such as an OS (Operating System), middleware and application software, and data. The optimization device 1a may include other types of memory devices such as a flash memory and an SSD (Solid State Drive), and may include a plurality of nonvolatile memory devices.

The NIC 104 is an interface that is connected to a network 40 and communicates with other computers via the network 40. For example, the NIC 104 is connected to a communication device such as a switch or a router by a cable.

The output IF 105 outputs an image to a display 41 connected to the optimization device 1a in accordance with a command from the CPU 101. As the display 41, any type of display such as a CRT (Cathode Ray Tube) display, a liquid crystal display (LCD), a plasma display, an organic EL (OEL: Organic Electro-Luminescence) display, or the like may be used.

The input IF 106 acquires an input signal from an input device 42 connected to the optimization device 1a and outputs the input signal to the CPU 101. As the input device 42, a pointing device such as a mouse, a touch panel, a touch pad, a trackball, or the like, a keyboard, a remote controller, a button switch, or the like may be used. A plurality of types of input devices may be connected to the optimization device 1a.

The medium reader 107 is a reader that reads programs and data recorded on the recording medium 43. As the recording medium 43, for example, a magnetic disk, an optical disk, a magneto-optical disk (MO), a semiconductor memory, or the like may be used. The magnetic disk includes a flexible disk (FD) and an HDD. The optical disk includes a CD (Compact Disc) and a DVD (Digital Versatile Disc).

The medium reader 107 copies the programs and data read from, for example, the recording medium 43 to another recording medium such as the RAM 102 and the HDD 103. The read programs are executed by, for example, the CPU 101. The recording medium 43 may be a portable recording medium and may be used for distribution of programs and data. Further, the recording medium 43 and the HDD 103 may be referred to as computer-readable recording media.

The stochastic search unit 108 is an accelerator that performs a calculation for the combinatorial optimization problem by hardware using a replica exchange method. The stochastic search unit 108 includes search units 10a1 to 10aN, a temperature adjustment unit 21, a temperature controller 22, and an exchange controller 23, and performs the stochastic search for searching for the ground state of the Ising model according to the above-described procedures of FIGS. 11 to 14.

The same function as that of the optimization device 1 may be implemented by the optimization device 1a.

Second Embodiment

Next, a second embodiment will be described.

The second embodiment is different from the configuration of FIG. 2 and subsequent figures described in the first embodiment in that values (spin bit strings) of a plurality of state variables in the search units 10a1 to 10aN are exchanged. In the second embodiment, the temperatures set in the search units 10a1 to 10aN are constant unless a temperature adjustment is performed. For example, the temperatures are set in ascending order or descending order for the search units 10a1 to 10aN.

Figure 18:
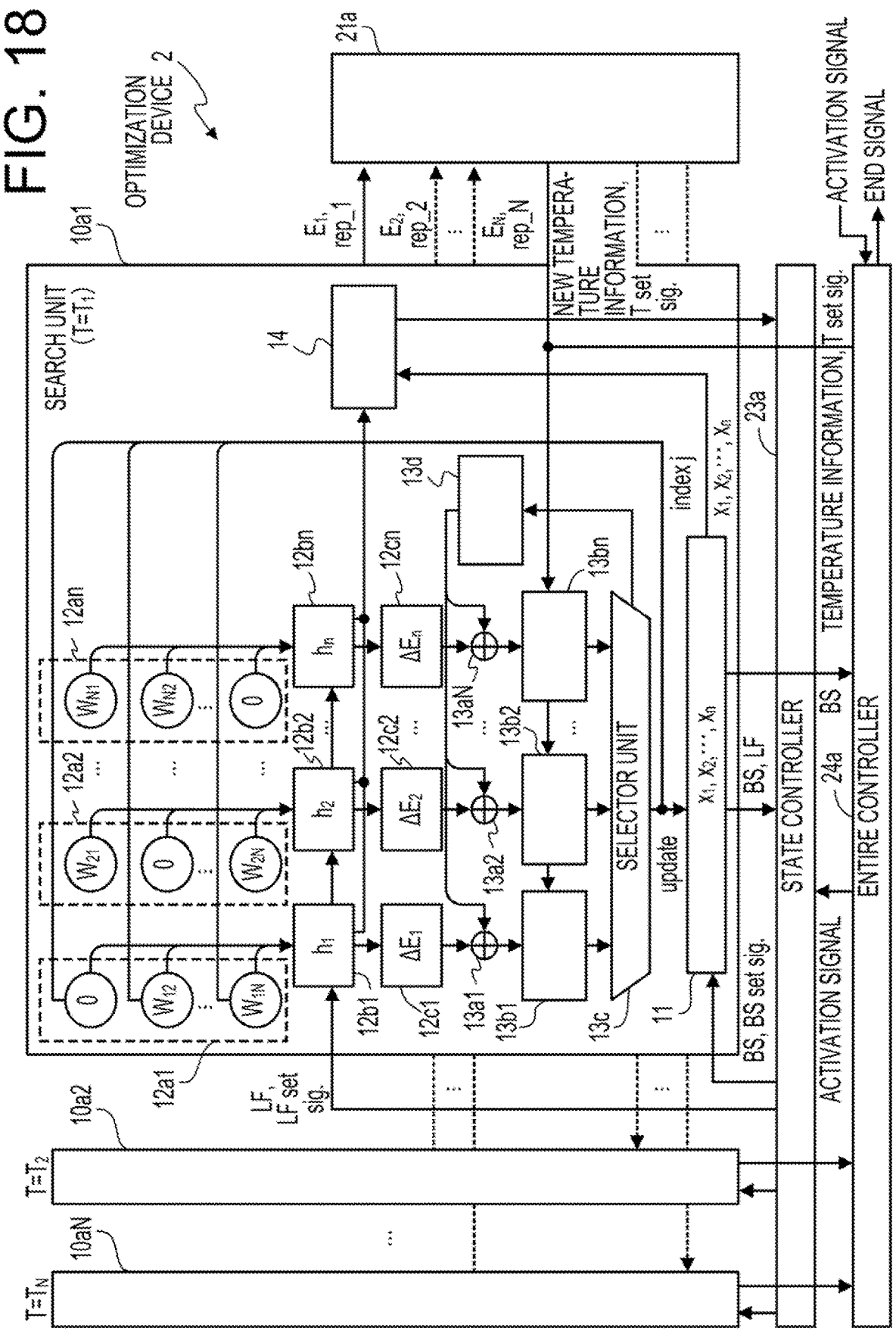
FIG. 18 is a view illustrating a circuit configuration example of an optimization device according to a second embodiment.

FIG. 18 is a view illustrating a circuit configuration example of an optimization device according to a second embodiment.

The optimization device 2 is implemented by using, for example, a semiconductor integrated circuit such as an FPGA. The optimization device 2 includes search units 10a1 to 10aN, a temperature adjustment unit 21a, a state controller 23a, and an entire controller 24a.

The search units 10a1 to 10aN have the same circuit configuration as the search units 10a1 to 10aN illustrated in FIG. 2 and therefore, explanation thereof will not be repeated.

However, in the second embodiment, for the state holding unit of each search unit, a bit state (spin bit string) and a replica number, which is bit state identification information, are set by the state controller 23a. Since the number of search units 10a1 to 10aN is N, the total number of bit states in the optimization device 2 is also N. Further, a local field is set by the state controller 23a for the h calculation unit of each search unit.

Further, the E calculation unit of each search unit outputs energy E to the temperature adjustment unit 21a and the state controller 23a. The E calculation unit of each search unit outputs the replica number set in each search unit, together with the energy E, to the temperature adjustment unit 21a. For example, FIG. 18 illustrates a case where a replica number "rep_1" is output from the search unit 10a1, a replica number "rep_2" is output from the search unit 10a2, and a replica number "rep_N" is output from the search unit 10aN.

The state holding unit 11 outputs the bit state and the local field (which may be abbreviated as LF in the figure) set in the h calculation units 12b1 to 12bn to the state controller 23a.

The temperature adjustment unit 21a receives the energy value and replica number output from each of the search units 10a1 to 10aN. The temperature adjustment unit 21a acquires the temperature set in each of the search units 10a1 to 10aN. FIG. 18 illustrates an example in which a temperature $T_1$ is set in the search unit 10a1, a temperature $T_2$ is set in the search unit 10a2, and a temperature $T_N$ is set in the search unit 10aN. The temperature adjustment unit 21a determines new temperature information indicating a new temperature to be set in each of the search units 10a1 to 10aN according to a change in energy value and a change in temperature corresponding to the bit state. The temperature adjustment unit 21a outputs the determined new temperature information and a new temperature setting signal (T set sig.) of the new temperature to the search units 10a1 to 10aN via a temperature controller (not illustrated). The new temperature information is set in state transition determination circuits (e.g., the state transition determination circuits 13b1 to 13bn) of each search unit.

The state controller 23a performs an exchange control of states (including the bit state and the local field) in the search units 10a1 to 10An. The state controller 23a is an example of the exchange controller 23.

The state controller 23a supplies a bit state and a bit state setting signal (BS set sig.) to the state holding unit included in each of the search units 10a1 to 10aN. The bit state setting signal includes a replica number corresponding to the bit state. Further, the state controller 23a supplies a local field and a local field setting signal (LF set sig.) to the h calculation unit included in each of the search units 10a1 to 10aN.

The state controller 23a determines whether to perform a state exchange on a pair of two search units having an adjacent temperature based on the exchange probability of the equation (5). The state controller 23a supplies the bit state and local field after the exchange to each search unit.

For example, the state controller 23a holds the first association information associating the temperature index with the temperature in a register included in the state controller 23a. For example, the temperature index is associated with the temperature in ascending order of temperature (as the temperature index becomes larger, the temperature becomes higher). In the second embodiment, the temperature index is also search unit identification information. Further, for example, the state controller 23a holds third association information that associates the temperature index arranged in ascending order of temperature and the identification number (replica number) of the bit state in a register included in the state controller 23a. The state controller 23a controls the exchange of states for the search units 10a1 to 10aN based on the first association information and the third association information, and updates the third association information according to the exchange. In the second association information, the state exchange may be performed for a pair of search units having an adjacent temperature index. The state controller 23a supplies the bit state and the local field to the search units 10a1 to 10aN based on the third association information.

However, the state controller 23a may hold association information that associates replica numbers and temperature values (temperature values which are arranged in ascending order or descending order in the order corresponding to the search units), and may perform an exchange control of states based on the association information. In this case, the temperature value in the association information is updated according to the calculation result of the new temperature by the temperature adjustment unit 21a.

The entire controller 24a controls the entire operation of the optimization device 2. The entire controller 24a receives an activation signal. Then, the entire controller 24a outputs initial temperature information and a temperature setting signal (T set sig.) to the search units 10a1 to 10aN, and sets the initial temperature in each of the search units 10a1 to 10aN. Then, the entire controller 24a outputs an activation signal to the state controller 23a to activate the search units 10a1 to 10aN and start calculation for the optimization problem.

When the calculation is ended, the entire controller 24a acquires a bit state from each of the search units 10a1 to 10aN and obtains a solution to the optimization problem. The entire controller 24a outputs an end signal indicating the end of the calculation. The end signal may include information indicating the solution obtained by the calculation. For example, the entire controller 24a may output image information indicating the solution to a display device connected to the optimization device 2 and display the image information indicating the solution on the display device so that the contents of the obtained solution may be presented to a user.

Figure 19:
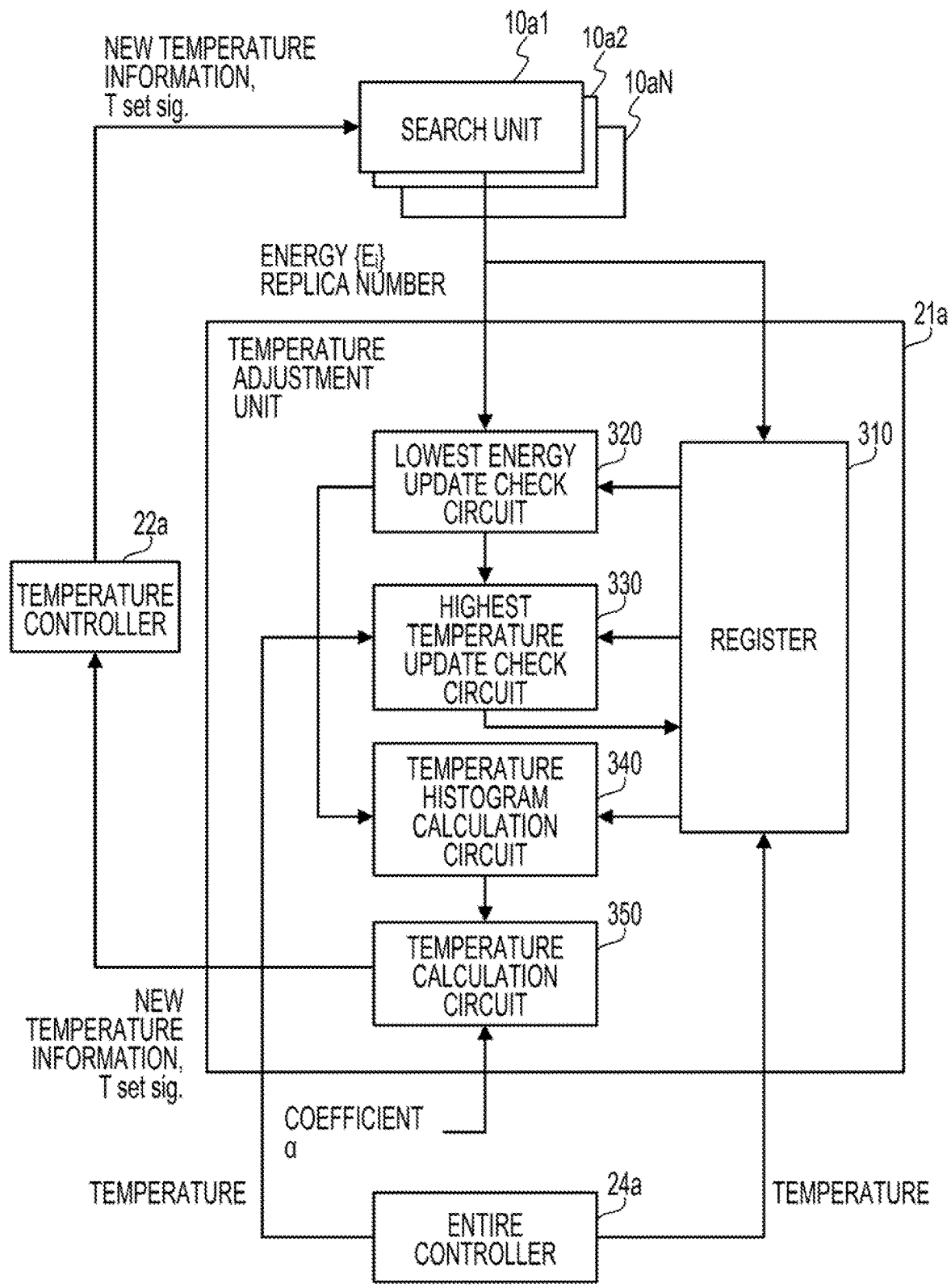
FIG. 19 is a view illustrating a circuit configuration example of a temperature adjustment unit.

FIG. 19 is a view illustrating a circuit configuration example of a temperature adjustment unit.

The temperature adjustment unit 21a includes a register 310, a lowest energy update check circuit 320, a highest temperature update check circuit 330, a temperature histogram calculation circuit 340, and a temperature calculation circuit 350. The optimization device 2 further includes a temperature controller 22a.

The register 310 stores the lowest energy reached and the highest value of a set temperature (highest temperature) in association with a replica number of each of N bit states.

The lowest energy update check circuit 320 receives the energy value E and the bit state replica number in each search unit from each of the search units 10a1 to 10aN at a predetermined data acquisition timing. The lowest energy update check circuit 320 compares the energy value E for each received replica number with the lowest energy for each replica number stored in the register 310 to check for each replica number whether the lowest energy has been updated. The lowest energy update check circuit 320 outputs a signal indicating the check result for each replica number as to whether the lowest energy has been updated, to the highest temperature update check circuit 330 and the temperature histogram calculation circuit 340. When the lowest energy has been updated for a certain replica number, the lowest energy update check circuit 320 updates the lowest energy of the corresponding replica number recorded in the register 310 to the energy acquired this time for the corresponding replica number.

When the check result by the lowest energy update check circuit 320 illustrates that the lowest energy has not been updated for a certain replica number, the highest temperature update check circuit 330 compares the current temperature for the corresponding replica number (bit state) with the highest temperature of the corresponding replica number stored in the register 310. The highest temperature update check circuit 330 checks for the corresponding replica number whether the highest temperature from the previous update of the lowest energy has been updated to the current set temperature in accordance with the comparison. When the highest temperature has been updated, the highest temperature update check circuit 330 updates the information on the highest temperature of the corresponding replica number recorded in the register 310 to the current set temperature corresponding to the corresponding replica number.

When the check result by the lowest energy update check circuit 320 indicates that the lowest energy has been updated for a certain replica number, the temperature histogram calculation circuit 340 counts on the temperature histogram the highest temperature of the corresponding replica number stored in the register 310. One temperature histogram is generated for all N bit states.

The temperature calculation circuit 350 calculates N new temperatures set in the search units 10a1 to 10aN based on the temperature histogram generated by the temperature histogram calculation circuit 340. The temperature calculation circuit 350 uses the equations (6) and (7) for calculation of the new temperatures. The lowest temperature tmp_min is preset in the temperature calculation circuit 350. The highest temperature tmp_max is determined by the temperature calculation circuit 350 based on the temperature histogram. A coefficient α to be used to calculate the new temperatures may be externally input to the temperature calculation circuit 350. The temperature calculation circuit 350 outputs new temperature information indicating the calculated new temperatures and a temperature setting signal (T set sig.) to the temperature controller 22a. Further, the temperature calculation circuit 350 outputs the new temperature information to the state controller 23a and updates the temperature associated with the temperature index in the first association information held by the state controller 23a. The temperature calculation method by the temperature calculation circuit 350 is the same as the temperature calculation method by the temperature calculation circuit 250.

Here, the temperature controller 22a receives the new temperature information and the temperature setting signal (T set sig.) from the temperature calculation circuit 350. Then, the temperature controller 22a outputs the new temperature information and the temperature setting signal (T set sig.) to the search units 10a1 to 10aN to set new temperatures or the search units 10a1 to 10aN.

Further, when the temperature adjustment unit 21a repeatedly performs the temperature adjustment at a predetermined cycle or the like in the entire ground state search period, the temperature adjustment unit 21a may acquire the information of temperature currently set in each of the search units 10a1 to 10aN from the temperature controller 22a or the state controller 23a.

Figure 20:
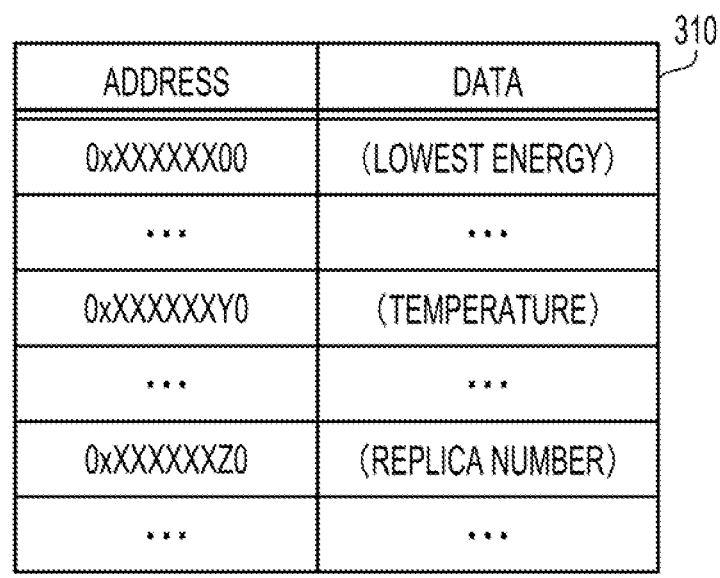
FIG. 20 is a view illustrating an example of data stored in a register.

FIG. 20 is a view illustrating an example of data stored in a register.

In a register 310, three addresses separated by a predetermined offset are associated with a set of records. For example, the addresses "0xXXXXXX00", "0xXXXXXXY0", and "0xXXXXXXZ0" are a set of records corresponding to a replica number stored in the address "0xXXXXXXZ0". The address "0xXXXXXX00" stores the lowest energy reached by a bit state corresponding to the corresponding replica number. For example, the lowest energy is represented by 128 bits wide. The address "0xXXXXXXY0" stores the highest temperature set in the corresponding bit state from the previous update of the lowest energy in the bit state of the corresponding replica number. For example, the temperature is represented by a 32-bit width. Further, far example, the replica number is represented by a 16-bit width.

Similarly, the lowest energy, the temperature, and the replica number are stored in the register 310 for bit states of other replica numbers.

In this way, the temperature adjustment unit 21a records the minimum value of the energy value reached for the corresponding bit state and the highest temperature set for the corresponding bit state in association with the identification information (replica number) of the bit state (a plurality of state variables) set in the search unit. Then, when the minimum value of the energy value is updated by any of the search units, the temperature adjustment unit 21a acquires, as temperature statistical information, the highest temperature value among the temperatures set for the bit state (a plurality of state variables) in the corresponding search unit from the previous update of the minimum value of the energy value to the current update of the minimum value of the energy value.

Next, the processing procedure by the optimization device 2 will be described.

Figure 21:
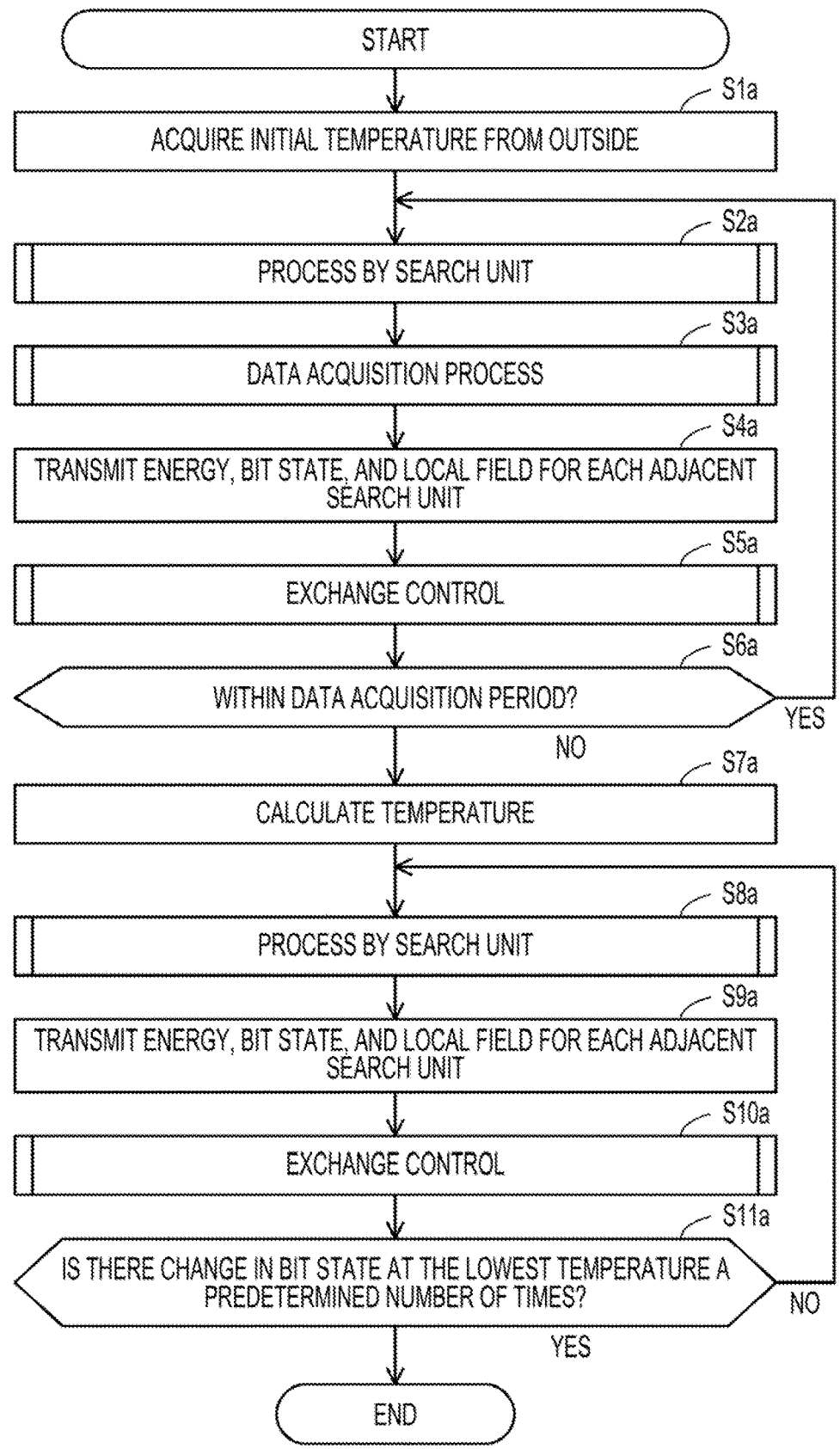
FIG. 21 is a flowchart illustrating an example of entire control of a replica exchange.

FIG. 21 is a flowchart illustrating an example of entire control of a replica exchange.

(S1a) The entire controller 24a receives temperature information indicating an initial temperature from the outside as input data, outputs the temperature information to the search units 10a1 to 10aN, and outputs an activation signal to the state controller 23a.

(S2a) In response to the activation signal received from the entire controller 24a, the state controller 23a causes each of the search units 10a1 to 10aN to execute a stochastic search process. The process (search process) procedure performed by each of the search units 10a1 to 10aN is the same as the procedure illustrated in FIG. 12.

(S3a) When stochastic search for a prescribed time or the prescribed number of iterations is performed in each of the search units 10a1 to 10aN, the temperature adjustment unit 21a performs a data collection process including acquisition of an energy value calculated in each of the search units 10a1 to 10aN and a replica number. The data collection process will be described in detail later.

(S4a) The search units 10a1 to 10aN transmit the energy value, bit state, and local field of each adjacent search unit to the state controller 23a. The state controller 23a acquires the energy value calculated in the search units 10a1 to 10aN, the bit state, and the local field for each pair of adjacent search units.

(S5a) The state controller 23a performs a state exchange control according to the exchange probability based on the equation (5) using an energy difference between search units adjacent to each other in terms of temperature. The state controller 23a performs the state exchange control for each pair of search units having an adjacent temperature. The state exchange control will be described in detail later.

(S6a) The temperature adjustment unit 21a determines whether the state exchange control is within a data acquisition period for temperature adjustment. When it is determined that the state exchange control is within the data acquisition period for temperature adjustment, the process proceeds to step S2a. When it is determined that the state exchange control is not within the data acquisition period for temperature adjustment, the process proceeds to step S7a.

(S7a) Based on the temperature histogram 80 (or the cumulative histogram 81) created as the result of the data collection process in step S3a, the temperature adjustment unit 21a calculates the highest temperature tmp_max used in the equations (6) and (7). The temperature adjustment unit 21a uses the calculated highest temperature tmp_max to calculate a new temperature tmp[i] based on the equations (6) and (7). The temperature adjustment unit 21 outputs new temperature information indicating the calculated new temperature and a temperature setting signal to the temperature controller 22a and the state controller 23a. Upon receiving the new temperature information and the temperature setting signal output from the temperature adjustment unit 21a, the state controller 23a updates a temperature associated with each temperature index in the first association information held by the state controller 23a.

(S8a) The temperature controller 22a sets a temperature by outputting the new temperature information and the temperature setting signal to each of the search units 10a1 to 10aN, and causes each of the search units 10a1 to 10aN to execute a stochastic search.

(S9a) When the stochastic search for a prescribed time or the prescribed number of iterations is performed in the search units 10a1 to 10aN, the search units 10a1 to 10aN transmit the energy value of each adjacent search unit, the bit state, and the local field to the state controller 23a. The state controller 23a acquires the energy value calculated by the search units 10a1 to 10aN, the bit state, and the local field for each adjacent search unit.

(S10a) The state controller 23a performs a state exchange control according to the exchange probability based on the equation (5) using an energy difference between search units adjacent to each other in terms of temperature. The state controller 23a performs the state exchange control for each pair of search units having an adjacent temperature.

(S11a) The search units 10a1 to 10aN determine whether there is a change in bit state in the search unit at the lowest temperature a predetermined number of times. When it is determined that there is no change in bit state in the search unit at the lowest temperature, the search units 10a1 to 10aN output the bit state to the entire controller 24 and end the entire control process of replica exchange. When it is determined that there is a change in bit state in the search unit at the lowest temperature, the search units 10a1 to 10aN proceed to step S8a where the stochastic search process continues.

Figure 22:
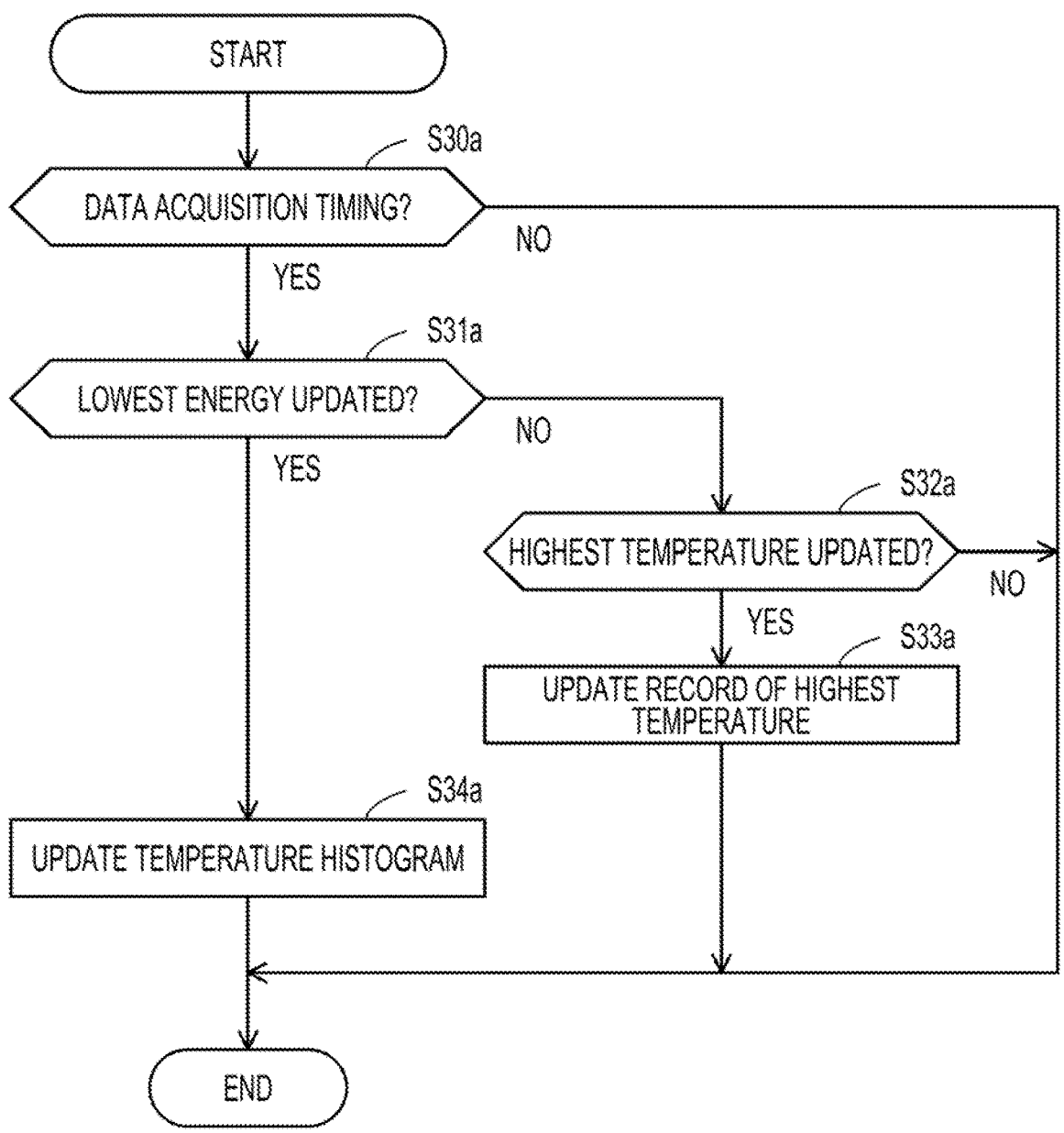
FIG. 22 is a flowchart illustrating an example of a data collection process.

FIG. 22 is a flowchart illustrating an example of a data collection process.

The data collection process corresponds to step S3a. Hereinafter, a procedure for the search unit 10a1 by the temperature adjustment unit 21a will be described, but the same procedure is applied to the search units 10a2 to 10aN.

The following steps S31a to S34a are executed for each of the search units 10a1 to 10aN. One temperature histogram 80 in step S34a is calculated for the search units 10a1 to 10aN.

(S30a) The lowest energy update check circuit 320 determines whether the timing is a data collection timing. When it is determined that the timing is a data collection timing, the process proceeds to step S31a. When it is determined that the timing is not a data collection timing, the data collection process is ended. As described above, the data collection timing may be a timing for each completion of the search process (the procedure of FIG. 12) of the search units 10a1 to 10aN, or may be a timing for each of plural times of completion of the search process.

(S31a) The lowest energy update check circuit 220 acquires energy $E_1$ and a replica number from the search unit 10a1. The lowest energy update check circuit 320 compares the lowest energy of the corresponding replica number stored in the register 310 with the acquired energy $E_1$ to determine whether the lowest energy has been updated. When it is determined that the lowest energy has been updated, the lowest energy update check circuit 220 updates the record of the lowest energy of the corresponding replica number stored in the register 310 to the energy $E_1$ acquired this time from the search unit 10a1, and the process proceeds to step S34a. When it is determined that the lowest energy has not been updated, the process proceeds to step S32a, (S32a) The highest temperature update check circuit 330 acquires the temperature set in the search unit 10a1, and determines whether the highest temperature for the corresponding replica number stored in the register 310 has been updated. When it is determined that the highest temperature has been updated, the process proceeds to step S33a. When it is determined that the highest temperature has not been updated, the data collection process for the corresponding replica number is ended.

(S33a) The highest temperature update check circuit 330 updates the record of the highest temperature of the corresponding replica number stored in the register 310 to the temperature set in the search unit 10a1. Then, the data collection process for the corresponding replica number is ended.

(S34a) The temperature histogram calculation circuit 340 reads the highest temperature corresponding to the corresponding replica number from the register 310, and adds 1 to the frequency of the highest temperature in the temperature histogram 80. As described above, one temperature histogram 80 is generated for the search units 10a1 to 10aN (N bit states). In addition, the highest temperature update check circuit 330 updates the record of the highest temperature of the corresponding replica number stored in the register 310 to the temperature currently set in the search unit 10a1. Then, the data collection process for the corresponding replica number is ended.

The temperature adjustment unit 21a may execute the processes of steps S31a to S34a in parallel for each of the search units 10a1 to 10aN. Alternatively, the temperature adjustment unit 21a may select any one of the search units 10a1 to 10aN in order and repeatedly execute the processes of steps S31 to S34.

In this way, the temperature adjustment unit 21a acquires the energy value from each of the search units 10a1 to 10aN after reaching the number of repetitions of the ground state search for the energy value or after a predetermined time has elapsed. Then, the temperature adjustment unit 21a performs the data collection process by checking for the bit state (values of a plurality of state variables) in each of the search units 10a1 to 10aN whether the minimum value of the energy value has been updated.

Figure 23:
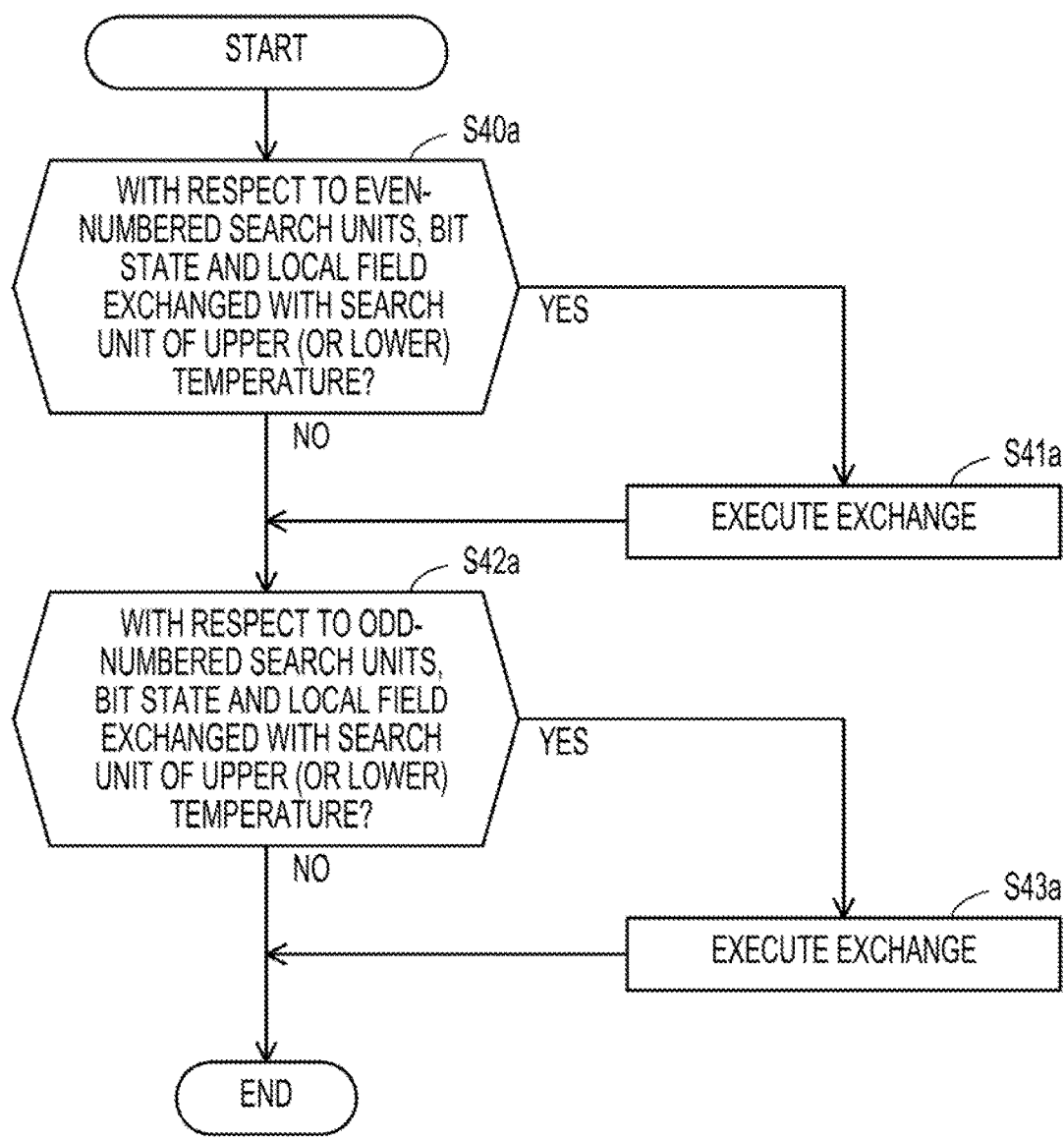
FIG. 23 is a flowchart illustrating an example of an exchange control.

FIG. 23 is a flowchart illustrating an example of an exchange control.

The exchange control corresponds to steps S5a and S10a.

(S40a) With respect to the even-numbered search units, the state controller 23a determines whether to exchange a bit state and a local field with the search unit of the adjacent upper (or lower) temperature based on the exchange probability expressed by the equation (5). The bit state and local field exchange determination is performed for each pair of search units. As the function f of the equation (5), the function of the Metropolis method of the equation (2) or the function of the Gibbs method of the equation (3) is used. When there is a pair of search units determined to exchange the bit state and local field, the process proceeds to step S41a. When there is no search unit pair determined to exchange the bit state and local field, the process proceeds to step S42a.

(S41a) The state controller 23a exchanges the bit state and local field for the pair of search units determined to exchange the bit state and local field in step S40a. The state controller 23a updates the above-mentioned third association information held by the state controller 23a according to the exchange of the state.

(S42a) With respect to the odd-numbered search units, the state controller 23a determines whether to exchange the bit state and local field with the search unit of the adjacent upper (or lower) temperature based on the exchange probability expressed by the equation (5). The bit state and local field exchange determination is performed for each pair of search units. As the function f of the equation (5), the function of the Metropolis method of the equation (2) or the function of the Gibbs method of the equation (3) is used. When the state controller 23a determines in step S40a whether to exchange the state with the search unit of the upper temperature for the even-numbered search units, the state controller 23a determines in step S42a whether to exchange the state with the search unit of the upper temperature for the odd-numbered search units. When the state controller 23a determines in step S40a whether to exchange the state with the search unit of the lower temperature for the even-numbered search units, the state controller 23a determines in step S42a whether to exchange the state with the search unit of the lower temperature for the odd-numbered search units. When there is a pair of search units determined to exchange the bit state and local field, the process proceeds to step S43a. When there is no search unit pair determined to exchange the bit state and local field, the exchange control is ended.

(S43a) The state controller 23 exchanges the bit state and local field for the pair of search units determined to exchange the bit state and local field in step S42a. The state controller 23a updates the third association information held by the state controller 23a according to the state exchange. Then, the exchange control is ended.

Further, in the above example, focusing on the odd-numbered search units next to the even-numbered search units, the state exchange control is performed. However, focusing on the even-numbered search units next to the odd-numbered search units, the state exchange control may be performed. That is, steps S40a and S41a may be executed after steps S42a and S43a.

In this way, the optimization device 2 may perform the ground state search of the Ising model by exchanging states between search units in the replica exchange.

The optimization device 2 may appropriately determine the temperatures set in the search units 10a1 to 10aN. Specifically, by determining the highest value of the new temperature tmp[i] based on the update of the lowest energy in the data acquisition period and the statistical information of the set highest temperature, it is possible to prevent the temperature set in each search unit from being too high or too low. Therefore, the solution precision in the optimization device 2 may be improved. In addition, the improvement in solution accuracy increases the possibility of reaching an appropriate solution earlier, thereby increasing the calculation speed.

Further, in order to determine an appropriate highest temperature (a temperature corresponding to tmp_max), it is conceivable that the optimization process by the optimization device 2 is repeatedly executed and a user manually adjusts such a process. However, this takes a lot of labor. In the meantime, as described above, by determining the highest temperature tmp_max based on the temperature statistical information, it is possible to reduce the labor of temperature adjustment by the user work.

Further, as in the first embodiment, the temperature adjustment function in the optimization device 2 may be implemented by software processing by a CPU. The optimization device 2 may also have the hardware configuration as the optimization device 1a. However, the stochastic search unit performs control to exchange states between search units in replica exchange.

Figure 24:
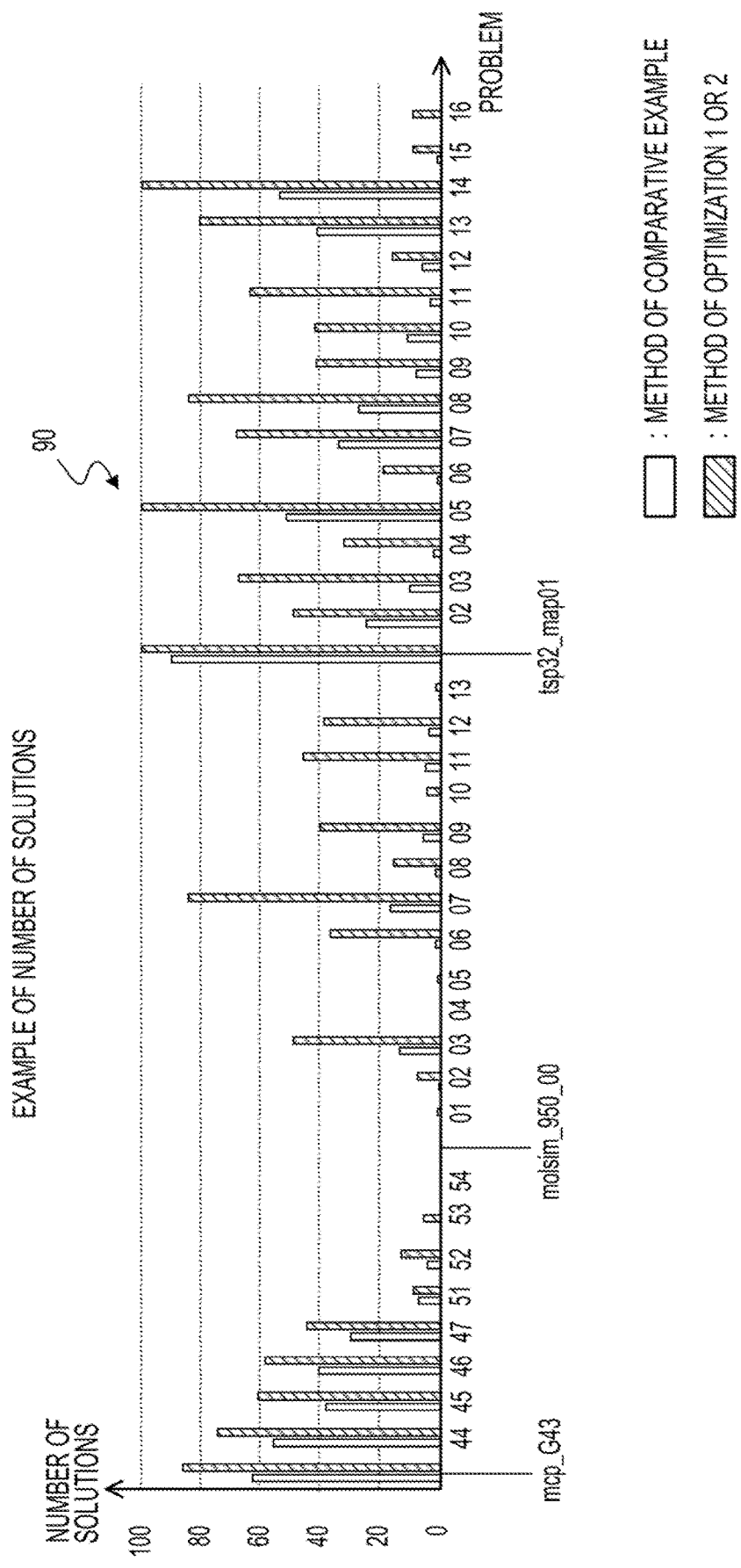
FIG. 24 is a view illustrating an example of the number of solutions.
Figure 25:
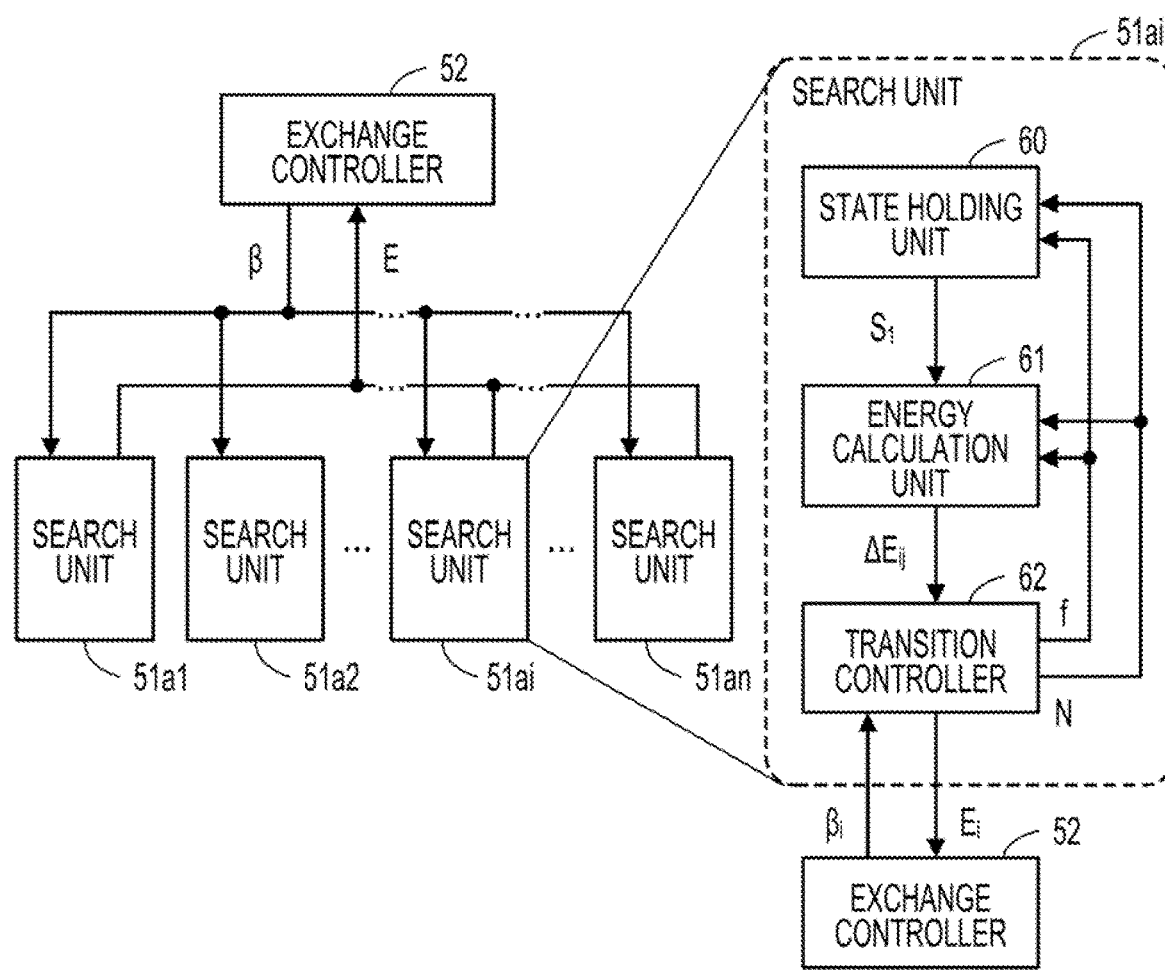
FIG. 25 is a view illustrating a configuration example of an optimization device using a normal replica exchange method.

FIG. 24 is a view illustrating an example of the number of solutions.

A graph 90 exemplifies the number of solutions of the combinatorial optimization problem obtained when a temperature is determined and calculated by a method of a comparative example and the number of solutions of the combinatorial optimization problem obtained when temperature adjustment is performed by the optimization devices 1 and 2 (or the optimization device 1a). In the graph 90, the horizontal axis represents a problem and the vertical axis represents the number of solutions. The method of the comparative example is a method of determining the highest temperature by a predetermined calculation based on a coefficient matrix W representing the coupling between spin bits at the start of the calculation, and determining a temperature to be set in each search unit.

The experimental conditions are as follows. The total number of iterations of the ground state search is 10 million. The number of replicas (corresponding to the number of search units 10a1 to 10aN) is 100. The increment value of an offset value used for local solution escape by the offset controller of each search unit is 1,000. In the experiments, a combinatorial optimization problem whose solution is known in advance is used, and after the total number of iterations of the ground state search is completed, the number of search units whose solution is obtained is counted.

Here, a character string attached to the horizontal axis is the name of a problem, and a prefix indicated by an alphabet or a combination of alphabet and number indicates the type of problem. For example, a prefix "mcp" indicates a maximum cut problem. A prefix "molsim" indicates a molecular similarity problem. A prefix "tsp32" indicates a traveling salesman problem. In addition, a character string following the prefix indicates variations in that type of problem.

From the graph 90, it may be seen that the solution increases in the molecular similarity problem ("molsim_950_XX") and the traveling salesman problem ("tsp32_mapXX"). In addition, regarding the maximum cut problem, it may be seen that, in certain variations (e.g., mcp_G51 to mcp_G54), the solution solving performance is almost equivalent to the method of the comparative example. As for the graph 90, when viewed from the entire viewpoint, it may be seen that the methods of the optimization devices 1 and 2 tend to be improved over the method of the comparative example and the solution solving performance is improved. Further, since the number of solutions increases, the possibility of reaching the optimal solution faster than the method of the comparative example increases, thereby achieving a faster calculation speed.

According to an aspect of the embodiments, the solution accuracy may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optimization device comprising:
  a plurality of search circuits, each including;
    a state hold circuit configured to hold values of a plurality of state variables included in an evaluation function representing an energy value;
    an energy calculation circuit configured to perform a ground state search by calculating a change value of the energy value for each of a plurality of state transitions which occurs in response to a change in one of values of the plurality of state variables; and
    a transition controller configured to determine stochastically whether to accept one of the plurality of state transitions according to a relative relationship between the change value of the energy value and thermal excitation energy, based on a set temperature value, the change value, and a random number value; and
  a controller including:
    a temperature adjustment circuit configured to:
    acquire temperature statistical information, which is statistical information regarding a transition of a temperature value in each of the plurality of search circuits; and
    determine a temperature value to be set in each of the plurality of search circuits based on the acquired temperature statistical information;
    a temperature controller configured to set the determined temperature value for each of the plurality of search circuits; and
    an exchange controller configured to exchange the temperature value or the values of the plurality of state variables between the plurality of search circuits after a predetermined number of repetitions of the ground state search for the energy value is reached or after a predetermined time elapses,
    when a minimum value of the energy value is updated in one of the search circuits, the temperature adjustment circuit acquires a highest temperature value among temperature values set for the one of the search circuits or set for the values of the plurality of state variables in the one of the search circuits from a previous update to a current update of the minimum value of the enemy value as the temperature statistical information.

2. The optimization device according to claim 1, wherein the temperature adjustment circuit is configured to set, in each of the plurality of search circuits, a temperature value corresponding to a maximum value of an appearance frequency in temperature frequency information that is obtained by counting an appearance frequency of each temperature value with respect to the transition of the temperature value in the acquired temperature statistical information.

3. The optimization device according to claim 1, wherein the temperature adjustment circuit is configured to set, in each of the plurality of search circuits, a temperature value corresponding to a frequency obtained by multiplying a maximum value of a cumulative frequency by a predetermined coefficient in temperature accumulative frequency information that indicates a cumulative frequency that is obtained by accumulating an appearance frequency of each temperature value with respect to the transition of the temperature value in the acquired temperature statistical information.

4. The optimization device according to claim 3, wherein the predetermined coefficient is externally input.

5. The optimization device according to claim 1, wherein the transition controller is configured to add a predetermined offset value to the change value of the energy value when determining stochastically whether to accept one of the plurality of state transitions.

6. The optimization device according to claim 1, wherein the temperature adjustment circuit is configured to:
  determine a highest value of the temperature value to be set in each of the plurality of search circuits from the acquired temperature statistical information; and
  determine a temperature value other than the highest value to be set in each of the plurality of search circuits based on the highest value.

7. The optimization device according to claim 1, wherein the temperature adjustment circuit is configured to:
  acquire the energy value from each of the plurality of search circuits after the number of repetitions of ground state search for the energy value is reached or after a predetermined time elapses; and
  check for each of the plurality of search circuits or the values of the plurality of state variables in each of the plurality of search circuits whether the minimum value of the energy value has been updated.

8. The optimization device according to claim 1, wherein the temperature adjustment circuit is configured to:
  acquire the temperature statistical information in a predetermined period in which a first temperature value is set in each of the plurality of search circuits; and
  determine a second temperature value to be set for each of the plurality of search circuits based on the temperature statistical information after the predetermined period is ended.

9. A control method of an optimization device, the control method comprising:
  holding, by a state hold circuit included in each of a plurality of search circuits included in the optimization device, values of a plurality of state variables included in an evaluation function representing an energy value;
  performing, by an energy calculation circuit included in each of the plurality of search circuits, a ground state search by calculating a change value of the energy value for each of a plurality of state transitions which occurs in response to a change in one of values of the plurality of state variables;

determining stochastically, by a transition controller included in each of the plurality of search circuits, whether to accept one of the plurality of state transitions according to a relative relationship between the change value of the energy value and thermal excitation energy, based on a set temperature value, the change value, and a random number value;

acquiring, by a temperature adjustment circuit included in a controller included in the optimization device, temperature statistical information, which is statistical information regarding a transition of a temperature value in each of the plurality of search circuits;

determining, by the temperature adjustment circuit included in the controller, the temperature value to be set in each of the plurality of search circuits based on the acquired temperature statistical information;

setting, by a temperature controller included in the controller, the determined temperature value for each of the plurality of search circuits; and exchanging, by an exchange controller included in the controller, the temperature value or the values of the plurality of state variables between the plurality of search circuits after a predetermined number of repetitions of the ground state search for the energy value is reached or after a predetermined time elapses, when a minimum value of the enemy value is updated in one of the search circuits, the acquiring acquires a highest temperature value among temperature values set for the one of the search circuits or set for the values of the plurality of state variables in the one of the search circuits from a previous update to a current update of the minimum value of the energy value as the temperature statistical information.

* * * * *